(12) United States Patent
Mazurkiewicz et al.

(10) Patent No.: US 8,537,451 B2
(45) Date of Patent: Sep. 17, 2013

(54) PROCESSES FOR PRODUCING ELECTROCHROMIC SUBSTRATES AND ELECTROCHROMIC ARTICLES MADE THEREFROM

(75) Inventors: Jakub Henryk Mazurkiewicz, Seaview Downs (AU); Gordon George Wallace, New South Wales (AU); Charles Peter Innis, New South Wales (AU); Scott A. Edwards, Broadview (AU); Peter J. Murphy, Flagstaff Hill (AU); Colin Hall, Brighton (AU); Rick Fabretto, Warradale (AU); Kamil Zuber, Jaworzno (PL)

(73) Assignee: SMR Patents S.a.r.l., Luxembourg (LU)

( * ) Notice: Subject to any disclaimer, the term of this patent is extended or adjusted under 35 U.S.C. 154(b) by 154 days.

(21) Appl. No.: 12/934,816

(22) PCT Filed: Feb. 4, 2009

(86) PCT No.: PCT/AU2009/000125
§ 371 (c)(1),
(2), (4) Date: Sep. 27, 2010

(87) PCT Pub. No.: WO2009/117761
PCT Pub. Date: Oct. 1, 2009

(65) Prior Publication Data
US 2011/0261430 A1    Oct. 27, 2011

(30) Foreign Application Priority Data
Mar. 26, 2008    (AU) .................... 2008201373

(51) Int. Cl.
*G02F 1/153*    (2006.01)

(52) U.S. Cl.
USPC .................................................. 359/273

(58) Field of Classification Search
USPC ........................................ 359/265–275, 321
See application file for complete search history.

(56) References Cited

U.S. PATENT DOCUMENTS

| 5,913,147 | A | 6/1999 | Dubin et al. |
| 6,033,592 | A | 3/2000 | Chandrasekhar |
| 6,157,479 | A | 12/2000 | Heuer et al. |

(Continued)

FOREIGN PATENT DOCUMENTS

| EP | 0492387 | 7/1992 |
| JP | 62124534 | 6/1987 |

(Continued)

OTHER PUBLICATIONS

International Search Report for application No. PCT/AU2009/000125 dated Feb. 19, 2009.

(Continued)

*Primary Examiner* — Joseph P Martinez
(74) *Attorney, Agent, or Firm* — Reising Ethington PC

(57) ABSTRACT

The present invention provides a process for producing an electroactive substrate. The process includes providing a substrate having an oxidant layer on a surface thereof, exposing the surface containing the oxidant layer to a vapor containing an aryl or heteroaryl monomer that is polymerizable to form an electroactive polymer, and polymerizing the aryl or heteroaryl monomer in the presence of a volatile Lewis base to form a polyaryl or polyheteroaryl electroactive polymer film on the surface of the substrate. The invention also provides electroactive substrates formed by the process.

30 Claims, 10 Drawing Sheets

(56) References Cited

U.S. PATENT DOCUMENTS

2003/0072932 A1   4/2003   Gandon
2006/0269664 A1*  11/2006  Gleason et al. ............ 427/248.1
2007/0071987 A1   3/2007   Winther-Jensen

FOREIGN PATENT DOCUMENTS

| JP | 62144145 | 6/1987 |
| JP | 2008026607 | 2/2008 |
| WO | 9211645 | 7/1992 |

OTHER PUBLICATIONS

European Search Report for application No. EP 08 10 3179 dated Oct. 29, 2008.

A. Mohammadi et al; Chemical Vapour Deposition (CVD) of Conducting Polymers: Polypyrrole; Synthetic Metals, 14 (1986); pp. 189-197.

J.D. Affinito et al; High rate vacuum deposition of polymer electrolytes; J. Vac. Sci. Technol. A 14(3), 1996, pp. 733-738; XP002500282.

J.D. Affinito et al; PML/oxide/PML barrier layer performance differences arising from use of UV or electron beam polymerization of the PML layers; Thin Solid Films, vol. 308-309, 1997, pp. 19-25; XP002500283.

A. Yasuda et al; Electropolymerization of a vacuum-evaporated monomer film. The Case of 1-pyrenamine as a monomer; J. Electroanal. Chem.; vol. 288, 1990, pp. 65-74, XP002500284.

* cited by examiner

PROCESSES FOR PRODUCING ELECTROCHROMIC SUBSTRATES AND ELECTROCHROMIC ARTICLES MADE THEREFROM

This international patent application claims priority from Australian patent application No. 2008201373 filed on 26 Mar. 2008, the contents of which is to be taken as incorporated herein by this reference.

FIELD

The present invention relates to processes for the production of electroactive polymers and to the production of articles having an electroactive polymer surface. More specifically, the present invention relates to processes for the production of electrochromic polymers suitable for use in the production of electrochromic devices and articles including such devices, such as electrochromic mirrors and windows.

BACKGROUND

Electroactive polymers are conducting polymers in which at least one property of the polymer changes when an electric field is applied. These polymers, which are otherwise known as inherently conducting polymers or ICPs, are widely used in industry. For example, highly transparent electroactive polymers can be used in display devices, such as liquid crystal display devices. Highly transparent electroactive polymer thin films are used as electrochromic materials. Electrochromic materials are materials that reversibly change colour when placed in the presence of an electric field.

Various electrochromic materials are known. "Inorganic" electrochromic materials can be formed from certain "inorganic" transition metal oxides, such as tungsten oxide, molybdenum oxide, and vanadium oxide. In the absence of an applied electric field inorganic electrochromic materials are in a neutral state having intermediate transparency and consequently substrates containing the materials display an intermediate transparent or reflective surface. On the other hand, when an electric field is applied to the electrochromic materials they change to a coloured state, thereby reducing the amount of light transmitted through the electrochromic substrate in the case of a transparent substrate such as a window, or the amount of light reflected from the surface of a substrate having a reflective surface, such as a mirror. Removal of the electric field returns the electrochromic materials to their intermediate neutral state.

"Organic" electrochromic materials can be formed from certain polymers. For example, electrochromic polymer films may be prepared by dissolving organic polymers in a solvent, casting or coating the resulting solution onto an electrode substrate, and removing the solvent to form an electrochromic substrate having the electrochromic conducting polymer on the surface of the substrate. An example of an "organic" electrochromic material is polyaniline which can be formed either by the electrochemical or chemical oxidation of aniline. The materials are normally in a neutral state when no electrical field is present, but change to a coloured state when an electric field is applied and conversely change to an uncoloured (sometimes called a "bleached" state) when the electric field is reversed.

Electrochromic materials may be coated onto transparent substrates, such as glass, or onto reflective substrates, such as mirrors, to form electrochromic substrates. Electrochromic devices containing electrochromic substrates as described above are known in the art. Typically, these devices are electrolytic cells including an anodic electrochromic substrate, a cathodic electrochromic substrate, and an electrolyte. The two electrochromic substrates are typically separate and distinct from one another and assembled in a spaced apart relationship.

One application of electrochromic devices has been in the field of rear view mirrors for motor vehicles. Electrochromic rear view mirrors change from a full reflectance mode (day) to a partial reflectance mode (night) for protection from light emanating from the headlights of vehicles approaching from the rear.

Among the different electroactive polymers used in practical applications, poly(3,4-ethylenedioxythiophene) (PEDOT) is a stable electroactive conjugated polymer. PEDOT can be formed by oxidatively polymerizing 3,4-ethylenedioxythiophene (EDOT) monomer by wet chemical polymerization, electrochemical polymerization or vapour phase polymerization. A common method for obtaining PEDOT films is to polymerize EDOT via wet chemical oxidation and then apply the polymer to a substrate using a suitable coating process, such as dip coating, spin coating, printing, spray coating, etc. A difficulty with this approach to film formation is that PEDOT is difficult to maintain in solution. In response to this difficulty polyelectrolytes, such as poly(styrenesulfonate), have been used to form stable PEDOT:polyelectrolyte suspensions. However, the use of a polyelectrolyte can adversely affect the conductivity of the PEDOT film.

Electrochemical polymerization can also be used to deposit PEDOT films on substrates. Thus, EDOT monomer can be coated onto a conductive substrate and the sample placed into a three electrode cell with an electrolyte. A periodic voltage can be cycled across the cell, with each cycle increasing the amount of PEDOT deposited on the substrate. After 20-40 cycles film growth is generally finished. Whilst the PEDOT films formed using this method are generally high in quality, the deposition technique only allows for PEDOT films to be formed on conductive substrates and the technique is not well suited to large scale and/or commercial applications.

PEDOT films have also been formed on substrates by vapour phase polymerization of EDOT. In this method, a substrate is coated with an oxidant and the oxidant coated substrate is placed in to a chamber containing EDOT monomer in the vapour phase. Under appropriate conditions the monomer condenses on the substrate and polymerizes, creating a highly conductive and homogenous PEDOT film.

Vapour phase polymerization methods were initially developed using $FeCl_3$ or $H_2O_2$ as oxidant in the formation of polypyrrole films. Subsequently, iron(III) tosylate was used as oxidant in the vapour phase polymerization of pyrrole. More recently, iron(III) tosylate has been used as oxidant in the vapour phase polymerization of EDOT to produce PEDOT films. However, the homogeneity of films made via vapour phase polymerization has tended to be inferior to those made by solvent casting. It has been suggested (Winther-Jensen, et al., *Macromolecules* 2004, 37, 5930-5935) that the poor film quality obtained using $FeCl_3$ and/or iron (III) tosylate in the vapour phase polymerization may result from the formation of crystal-like structures in the oxidant layer. It has also been found that the oxidant iron(III) tosylate produced an undesirable polymerization route for EDOT which resulted in partially conjugated polymer chains.

There is a need for processes for producing PEDOT films, and other polyaryl or polyheteroaryl polymer films, that overcome one or more of the aforementioned problems with known processes. Alternatively, or in addition, there is a need for processes for producing PEDOT films, and other polyaryl or polyheteroaryl polymer films, that have a commercially acceptable conductivity for use in electrochromic devices. Alternatively, or in addition, there is a need for processes for producing PEDOT films, and other polyaryl or polyheteroaryl polymer films, having commercially acceptable conductivity to produce relatively large scale electrochromic devices, such as windows. Alternatively, or in addition, there is a need for processes for producing PEDOT films, and other polyaryl or polyheteroaryl polymer films, on substrates other than glass, such as plastic substrates.

Before turning to a summary of the present invention, it must be appreciated that the above description of the prior art has been provided merely as background to explain the context of the invention. It is not to be taken as an admission that any of the material referred to was published or known, or was a part of the common general knowledge.

SUMMARY

The present invention arises from our finding that the quality of polyaryl- and polyheteroaryl-based electroactive polymer films formed on substrates is enhanced by the presence of a volatile Lewis base during vapour phase polymerization. Furthermore, we have additionally found that the presence of an amphiphilic polymer during vapour phase polmerization also assists in improving the quality of the polyaryl- and polyheteroaryl-based electroactive polymer films.

The present invention provides a process for producing an electroactive substrate, the process including:
  providing a substrate having an oxidant layer on a surface thereof;
  exposing the surface containing the oxidant layer to a vapour containing an aryl or heteroaryl monomer that is polymerizable to form an electroactive polymer; and
  polymerizing the aryl or heteroaryl monomer in the presence of a volatile Lewis base to form a polyaryl or polyheteroaryl electroactive polymer film on the surface of the substrate.

The volatile Lewis base may be selected from the group consisting of: amine containing compounds, carbonyl containing compounds, aromatic heterocyclic compounds, hydroxyl containing compounds, ether containing compounds, ammonia and water.

In some embodiments, the volatile Lewis base is not pyridine.

In some embodiments, the volatile Lewis base is an amine containing compound.

In some embodiments, the volatile Lewis base is a carbonyl containing compound.

In some embodiments, the volatile Lewis base is water.

The aryl or heteroaryl monomer may be polymerized in the presence of the volatile Lewis base by exposing the surface of the substrate to a vapour containing the Lewis base or by including the Lewis base in the oxidant layer.

The step of exposing the surface containing the oxidant layer to a vapour containing an aryl or heteroaryl monomer that is polymerizable to form an electroactive polymer may be carried out at reduced pressure in a vacuum chamber or at atmospheric pressure in a sealed chamber.

When the step of exposing the surface containing the oxidant layer to a vapour containing an aryl or heteroaryl monomer is carried out at reduced pressure and the Lewis base is water the vapour containing the monomer may also contains water vapour. The vapour pressure of the water in the vacuum chamber may be about 5 mBar to about 30 mBar (inclusive). Alternatively, the vapour pressure of the water in the vacuum chamber is greater than 15 mBar.

When the step of exposing the surface containing the oxidant layer to a vapour containing an aryl or heteroaryl monomer is carried out at atmospheric pressure in a sealed chamber and the Lewis base is water the relative humidity in the chamber may be about 10% to about 70% relative humidity at a temperature of about 33° C.

Non-limiting examples of electroactive polymers that can be formed using the process of the present invention include poly-3,4-alkylenedioxythiophene, polypyrrole (PPy), and poly-terthiophene (PTTh). In an embodiment the electroactive polymer is a poly-3,4-alkylenedioxythiophene. In one specific embodiment the poly-3,4-alkylenedioxythiophene is poly-3,4-ethylenedioxythiophene (PEDOT). In another specific embodiment the poly-3,4-alkylenedioxythiophene is poly-3,4-propylenedioxythiophene (PRODOT). The electroactive polymer may also be a copolymer or mixture of any of the aforementioned polymers.

The oxidant layer may comprise a layer or coating containing any oxidant that is capable of oxidatively coupling aryl or heteroaryl monomers. A number of metal salts are suitable for this purpose. The metal may be a transition metal. In an embodiment the transition metal is iron (III). The metal salt may be a salt of an inorganic acid or an organic acid. In an embodiment the metal salt is a salt of an arylsulphonic acid. In a specific embodiment the oxidant is iron (III) tosylate.

We have found that the quality of polyaryl or polyheteroaryl electroactive polymer films is improved if exposure of the oxidant layer to water during deposition of that layer and handling of the substrate having the oxidant layer on the surface is minimised. In other words, minimising exposure of the oxidant layer to water at any stage prior to the step of exposing the substrate having the oxidant layer to a vapour containing an aryl or heteroaryl monomer may improve the electrical properties of the electroactive polymer film that is deposited. Thus, the step of providing a substrate having an oxidant layer on a surface thereof may include: (a) coating the surface of the substrate with an anhydrous oxidant solution, the solution containing an oxidant and a solvent; and (b) removing the solvent from the coating to form the oxidant layer on the surface. The step may also include minimising exposure of the oxidant layer on the surface to water vapour prior to the step of exposing the surface containing the oxidant layer to a vapour containing an aryl or heteroaryl monomer.

Advantageously, we have found that addition of certain copolymers into the oxidant solution can also improve the quality of the deposited polyaryl or polyheteroaryl electroactive polymer films. Thus, the present invention also provides a process for producing an electroactive substrate, the process including:
  providing a substrate having an oxidant layer on a surface thereof, the oxidant layer containing an oxidant and an amphiphilic polymer;
  exposing the surface containing the oxidant layer to a vapour containing an aryl or heteroaryl monomer that is polymerizable to form an electroactive polymer; and
  polymerizing the aryl or heteroaryl monomer to form a polyaryl or polyheteroaryl electroactive polymer film on the surface of the substrate.

The polymerization of the aryl or heteroaryl monomer may be carried out in the presence of a volatile Lewis base.

The step of providing a substrate having an oxidant layer on a surface thereof may include:
  coating the surface of the substrate with an oxidant solution, the solution containing the oxidant, an amphiphilic polymer, and a solvent; and removing the solvent to form the oxidant layer containing the oxidant and the amphiphilic polymer.

The amphiphilic polymer may be a poly(alkylene glycol) copolymer. The poly(alkylene glycol) copolymer may be a random copolymer or a block copolymer comprising poly (ethylene glycol) and poly(propylene glycol). In specific embodiments the poly(alkylene glycol) copolymer is selected from the group consisting of: a poly(propylene glycol)-poly (ethylene glycol)-poly(propylene glycol) triblock polymer, a poly(ethylene glycol)-poly(propylene glycol)-poly(ethylene glycol) triblock polymer, and a poly(ethylene glycol-ran-propylene glycol) random copolymer. The polyoxyalkylene copolymer may have a molecular weight of 1100 to 14600 Daltons, such as 2500 to 12000 Daltons.

Without intending to be bound by any particular theory, we expect that the amphiphilic polymer effectively "stabilises" the oxidant layer in a form that is particularly suitable for the subsequent monomer polymerization step.

Advantageously, we have found that the amphiphilic polymer can be loaded with water without the water detrimentally affecting the oxidant layer. However, the water that is loaded in the amphiphilic polymer also appears to be available to act as a Lewis base and assist in polymerization of the aryl or heteroaryl monomer to form the polyaryl or polyheteroaryl electroactive polymer film. Thus, the present invention also provides a process for producing an electroactive substrate, the process including:

providing a substrate having an oxidant layer on a surface thereof, the oxidant layer containing an oxidant and a hydrated amphiphilic polymer;

exposing the surface containing the oxidant layer to a vapour containing an aryl or heteroaryl monomer that is polymerizable to form an electroactive polymer; and polymerizing the aryl or heteroaryl monomer to form a polyaryl or polyheteroaryl electroactive polymer film on the surface of the substrate.

Polymerization of the aryl or heteroaryl monomer may be carried out in the presence of a volatile Lewis base. In one embodiment the Lewis base is water. The water may be water from the hydrated amphiphilic polymer and/or water vapour may be added to the vapour containing the aryl or heteroaryl monomer.

The step of providing a substrate having an oxidant layer on a surface thereof may include:

coating the surface of the substrate with an oxidant solution, the solution containing the oxidant, the hydrated amphiphilic polymer, and a solvent; and removing the solvent to form the oxidant layer containing the oxidant and the hydrated amphiphilic polymer.

This provides the possibility of the aryl or heteroaryl monomer polymerization step being carried out without additional water being added. Thus, the water that is loaded into the hydrated amphiphilic polymer may be sufficient to drive the polymerization step. Alternatively, the vapour containing the aryl or heteroaryl monomer may also contain water vapour but the relative humidity or vapour pressure required for polymerization may be reduced.

The hydrated amphiphilic polymer may contain water in an amount of about 0.01 wt % to about 2 wt % (inclusive).

From the foregoing description it will be evident that the present invention provides a process for producing an electroactive substrate, the process including:

providing a substrate having a surface onto which an electroactive film can be deposited;

coating the surface with an oxidant solution including an oxidant, a hydrated amphiphilic polymer, and a solvent;

removing the solvent from the coating to form an oxidant layer on the surface;

exposing the surface containing the oxidant layer to a vapour containing an aryl or heteroaryl monomer that is polymerizable to form an electroactive polymer; and polymerizing the aryl or heteroaryl monomer in the presence of a volatile Lewis base to form a polyaryl or polyheteroaryl electroactive polymer film on the surface of the substrate.

The present invention also provides an electroactive substrate produced by any of the aforementioned processes. The electroactive substrate may be an electrochromic substrate.

The present invention also provides an electrochromic device including an electrochromic substrate as described herein. Thus, the present invention provides an electrochromic device, the device including:

a first electrochromic substrate formed according to a process of the present invention;

a second electrochromic substrate spaced from the first electrochromic substrate, at least one of the first and second electrochromic substrates being transparent; and a substantially transparent ion conducting layer containing an electrolyte in contact with the first and second electrochromic substrates.

The present invention also provides an electrochromic device, the device including:

a first substantially transparent electrochromic substrate formed according to a process of the present invention;

a second electrochromic substrate spaced from the first electrochromic substrate, the second electrochromic substrate including a substrate, a reflective layer and an electrochromic film over the reflective layer; and a substantially transparent ion conducting layer containing an electrolyte in contact with the first and second electrochromic substrates.

The present invention also provides an article including an electrochromic device as described herein. In an embodiment the article is a vehicle mirror. In another embodiment the article is a window.

The present invention also provides an electrochromic mirror for a motor vehicle, the mirror including an electrochromic device in a housing, the electrochromic device including:

a substantially transparent first electrochromic substrate having a substantially transparent electrochromic polymer film on its inward surface;

a second electrochromic substrate positioned in spaced-apart relationship with the first electrochromic substrate, the second electrochromic substrate having a reflective layer on a surface thereof and an electrochromic film on the reflective layer;

a seal positioned toward a peripheral edge of each of the first and second electrochromic substrates and forming a sealed cavity therebetween;

an electrolyte located within said cavity and in contact with the electrochromic polymer film of the first electrochromic substrate and the electrochromic film of the second electrochromic substrate;

means for applying a potential to the first and second electrochromic substrates to controllably cause a variation in the amount of light reflected from the mirror, wherein the first electrochromic substrate is formed in accordance with a process of the present invention.

Using the processes of the present invention, it is possible to produce electrochromic substrates that include an electroactive polymer film on a surface of the substrate, wherein one or more of the physical properties of the substrate are desirable for use in applications such as for rear view mirrors for motor vehicles, for windows etc.

For example, an electroactive polymer film formed in accordance with a process of the present invention may have a colouration efficiency of greater than about 2000 cm$^2$/C as determined using the method set out in: (i) Fabretto, M., et al., *Electrochimica Acta* 2008, 53, 2250-2257; and (ii) Fabretto, M., et al., *Electrochemistry Communications* 2007, 9, 2032-2036.

Thus, the present invention provides an electrochromic device, the device including:
- a first electrochromic substrate including a conductive substrate coated with a polyaryl or polyheteroaryl electrochromic polymer film having a colouration efficiency of greater than about 2000 cm$^2$/C as measured herein;
- a second electrochromic substrate spaced from the first electrochromic substrate, the second electrochromic substrate including a conductive substrate coated with a second electrochromic film; and
- a substantially transparent ion conducting layer containing an electrolyte in contact with the first and second electrochromic substrates, wherein at least one of the first and second electrochromic substrates is substantially transparent.

The present invention also provides an electrochromic device, the device including:
- a first substantially transparent electrochromic substrate including a conductive substrate coated with a polyaryl or polyheteroaryl electrochromic polymer film having a colouration efficiency of greater than about 2000 cm$^2$/C as measured herein;
- a second electrochromic substrate spaced from the first electrochromic substrate, the second electrochromic substrate including a conductive substrate, a reflective layer and an electrochromic film over the reflective layer; and
- a substantially transparent ion conducting layer containing an electrolyte in contact with the first and second electrochromic substrates.

The present invention also provides an electrochromic mirror for a motor vehicle, the mirror including an electrochromic device in a housing, the electrochromic device including:
- a first substantially transparent electrochromic substrate including a conductive substrate coated with a polyaryl or polyheteroaryl electrochromic polymer film having a colouration efficiency of greater than about 2000 cm$^2$/C as measured herein on its inward surface;
- a second electrochromic substrate positioned in spaced-apart relationship with the first electrochromic substrate, the second electrochromic substrate having a reflective layer on a surface thereof an electrochromic film on the reflective layer;
- a seal positioned toward a peripheral edge of each of the first and second electrochromic substrates and forming a sealed cavity therebetween;
- an electrolyte located within said cavity and in contact with the electrochromic polymer film of the first electrochromic substrate and the electrochromic film of the second electrochromic substrate;
- means for applying a potential to the first and second electrochromic substrates to controllably cause a variation in the amount of light reflected from the mirror.

We have also found that an electroactive polymer film formed in accordance with a process of the present invention may have a switching speed of less than 0.5 sec to switch from the darkened state to the bleached state, and less than 0.7 sec to switch from the bleached state to the darkened state. As used herein, the "switching speed" is the time taken to go from the fully darkened state to 90% of the fully bleached state or the time taken to go from the fully bleached state to 90% of the darkened state.

Thus, the present invention provides an electrochromic device, the device including:
- a first electrochromic substrate including a conductive substrate coated with a polyaryl or polyheteroaryl electrochromic polymer film having a switching speed of less than 0.5 sec to switch from darkened state to bleached state, and less than 0.7 sec to switch from bleached state to darkened state;
- a second electrochromic substrate spaced from the first electrochromic substrate, the second electrochromic substrate including a conductive substrate coated with a second electrochromic film; and
- a substantially transparent ion conducting layer containing an electrolyte in contact with the first and second electrochromic substrates, wherein at least one of the first and second electrochromic substrates is substantially transparent.

The present invention also provides an electrochromic device, the device including:
- a first substantially transparent electrochromic substrate including a conductive substrate coated with a polyaryl or polyheteroaryl electrochromic polymer film having a switching speed of less than 0.5 sec to switch from darkened state to bleached state, and less than 0.7 sec to switch from bleached state to darkened state;
- a second electrochromic substrate spaced from the first electrochromic substrate, the second electrochromic substrate including a conductive substrate, a reflective layer and an electrochromic film over the reflective layer; and
- a substantially transparent ion conducting layer containing an electrolyte in contact with the first and second electrochromic substrates.

The present invention also provides an electrochromic mirror for a motor vehicle, the mirror including an electrochromic device in a housing, the electrochromic device including:
- a first substantially transparent electrochromic substrate including a conductive substrate coated with a polyaryl or polyheteroaryl electrochromic polymer film having a switching speed of less than 0.5 sec to switch from darkened state to bleached state, and less than 0.7 sec to switch from bleached state to darkened state on its inward surface;
- a second electrochromic substrate positioned in spaced-apart relationship with the first electrochromic substrate, the second electrochromic substrate having a reflective layer on a surface thereof an electrochromic film on the reflective layer;
- a seal positioned toward a peripheral edge of each of the first and second electrochromic substrates and forming a sealed cavity therebetween;
- an electrolyte located within said cavity and in contact with the electrochromic polymer film of the first electrochromic substrate and the electrochromic film of the second electrochromic substrate;
- means for applying a potential to the first and second electrochromic substrates to controllably cause a variation in the amount of light reflected from the mirror.

We have also found that an electroactive polymer film formed in accordance with a process of the present invention may have a delta change of % ΔR=45% photopic in reflection mode and a delta change of % ΔT=55% photopic in transmission mode. As used herein, the "photopic response" is a weighted average response in the 400-700 nm wavelength range that mimics the response of the human eye.

Thus, the present invention provides an electrochromic device, the device including:
- a first electrochromic substrate including a conductive substrate coated with a polyaryl or polyheteroaryl electrochromic polymer film having a delta change of % $\Delta R=45\%$ photopic in reflection mode or a delta change of % $\Delta T=55\%$ photopic in transmission mode;
- a second electrochromic substrate spaced from the first electrochromic substrate, the second electrochromic substrate including a conductive substrate coated with a second electrochromic film; and
- a substantially transparent ion conducting layer containing an electrolyte in contact with the first and second electrochromic substrates, wherein at least one of the first and second electrochromic substrates is substantially transparent.

The present invention also provides an electrochromic device, the device including:
- a first substantially transparent electrochromic substrate including a conductive substrate coated with a polyaryl or polyheteroaryl electrochromic polymer film having a delta change of % $\Delta T=55\%$ photopic in transmission mode;
- a second electrochromic substrate spaced from the first electrochromic substrate, the second electrochromic substrate including a conductive substrate, a reflective layer and an electrochromic film over the reflective layer; and
- a substantially transparent ion conducting layer containing an electrolyte in contact with the first and second electrochromic substrates.

The present invention also provides an electrochromic mirror for a motor vehicle, the mirror including an electrochromic device in a housing, the electrochromic device including:
- a first substantially transparent electrochromic substrate including a conductive substrate coated with a polyaryl or polyheteroaryl electrochromic polymer film having a delta change of % $\Delta R=45\%$ photopic in reflection mode;
- a second electrochromic substrate positioned in spaced-apart relationship with the first electrochromic substrate, the second electrochromic substrate having a reflective layer on a surface thereof an electrochromic film on the reflective layer;
- a seal positioned toward a peripheral edge of each of the first and second electrochromic substrates and forming a sealed cavity therebetween;
- an electrolyte located within said cavity and in contact with the electrochromic polymer film of the first electrochromic substrate and the electrochromic film of the second electrochromic substrate;
- means for applying a potential to the first and second electrochromic substrates to controllably cause a variation in the amount of light reflected from the mirror.

DESCRIPTION OF THE FIGURES

The present invention will now be described in relation to various embodiments of which some aspects are illustrated in the accompanying figures. In the figures.

DETAILED DESCRIPTION

Figure 1:
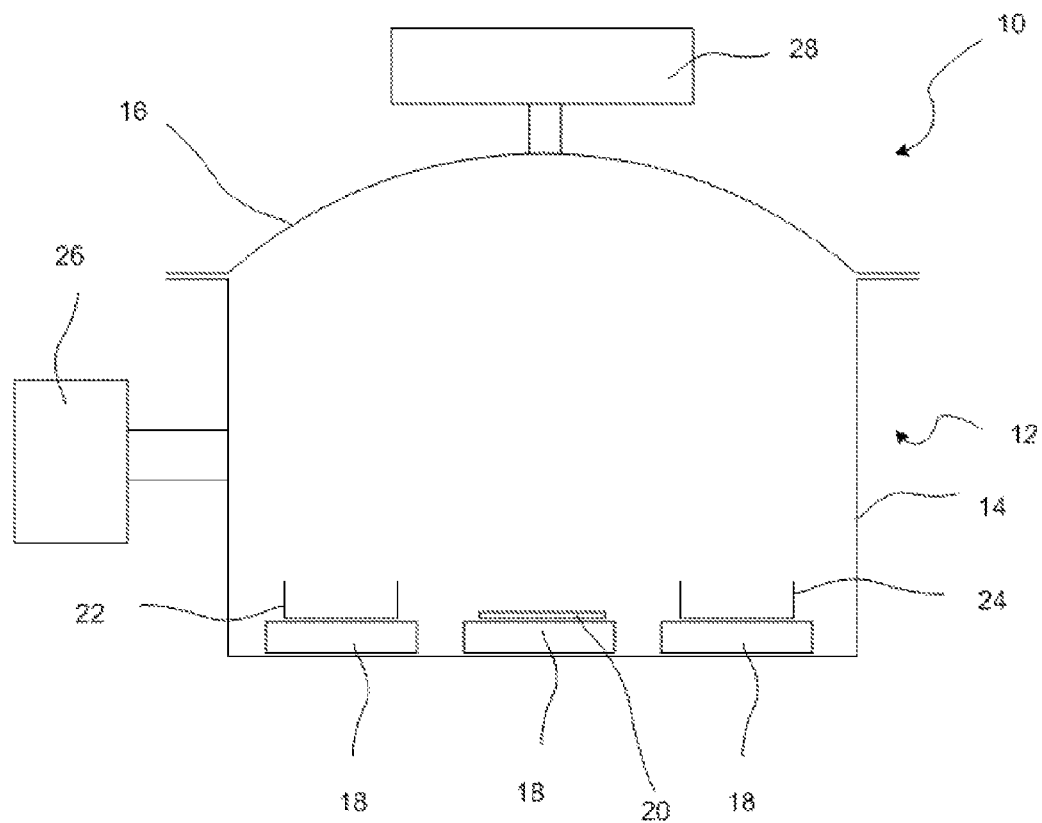
FIG. 1 is a schematic drawing of a vacuum chamber suitable for deposition and polymerization of aryl and heteroaryl monomers.

Before proceeding to describe the present invention, and embodiments thereof, in more detail it is important to note that various terms that will be used throughout the specification have meanings that will be well understood by a skilled addressee. However, for ease of reference, some of these terms will now be defined.

The term "electroactive", and variants thereof, as used throughout the specification is to be understood to mean a material in which at least one property of the material changes when an electric field is applied. The term "electrochromic", and variants thereof, as used throughout the specification is to be understood to mean a material that changes colour when an electric field is applied. Thus, electrochromic materials are electroactive materials.

The term "aryl", and variants thereof, as used throughout the specification is to be understood to mean (i) an optionally substituted monocyclic, or fused polycyclic, aromatic carbocycle (ring structure having ring atoms that are all carbon) preferably having from 5 to 12 atoms per ring. Examples of aryl groups include phenyl, naphthyl, and the like; (ii) an optionally substituted partially saturated bicyclic aromatic carbocyclic moiety in which a phenyl and a $C_{5-7}$ cycloalkyl or $C_{5-7}$ cycloalkenyl group are fused together to form a cyclic structure, such as tetrahydronaphthyl, indenyl or indanyl.

The term "heteroaryl", and variants thereof, as used throughout the specification is to be understood to mean groups containing an aromatic ring (preferably a 5 or 6 membered aromatic ring) having one or more heteroatoms as ring atoms in the aromatic ring with the remainder of the ring atoms being carbon atoms. Suitable heteroatoms include nitrogen, oxygen and sulphur. Examples of heteroaryl include thiophene, benzothiophene, benzofuran, benzimidazole, benzoxazole, benzothiazole, benzisothiazole, naphtho[2,3-b]thiophene, furan, isoindolizine, xantholene, phenoxatine, pyrrole, imidazole, pyrazole, pyridine, pyrazine, pyrimidine, pyridazine, indole, isoindole, 1H-indazole, purine, quinoline, isoquinoline, phthalazine, naphthyridine, quinoxaline, cinnoline, carbazole, phenanthridine, acridine, phenazine, thiazole, isothiazole, phenothiazine, oxazole, isooxazole, furazane, phenoxazine, 2-, 3- or 4-pyridyl, 2-, 3-, 4-, 5-, or 8-quinolyl, 1-, 3-, 4-, or 5-isoquinolinyl 1-, 2-, or 3-indolyl, and 2-, or 3-thienyl, and substituted derivatives of any of the aforementioned.

The term "Lewis base", and variants thereof, as used throughout the specification is to be understood to mean a molecule or ion capable of donating a pair of electrons to form a new coordinate covalent bond.

The term "volatile", and variants thereof, as used throughout the specification in reference to a Lewis base is to be understood to mean that the Lewis base has a boiling point of less than about 200° C. under use conditions.

The term "amphiphilic polymer", and variants thereof, as used throughout the specification is to be understood to mean a polymer that is composed of hydrophilic and hydrophobic segments. An amphiphilic polymer may also have lyophilic/lyophobic properties in that segments of the polymer (the lyophilic segments) may be compatible with a solvent containing the polymer, whilst the lyophobic segments are incompatible with the solvent.

The term "colouration efficiency", and variants thereof, as used throughout the specification is to be understood to mean the parameter determined using the method set out in: (i) Fabretto, M., et al., *Electrochimica Acta* 2008, 53, 2250-2257; and (ii) Fabretto, M., et al., *Electrochemistry Communications* 2007, 9, 2032-2036

The term "switching speed", and variants thereof, as used throughout the specification is to be understood to mean the time taken to go from the fully darkened state to 90% of the fully bleached state or the time taken to go from the fully bleached state to 90% of the darkened state.

The term "photopic response", and variants thereof, as used throughout the specification is to be understood to mean a weighted average response in the 400-700 nm wavelength range that mimics the response of the human eye.

As discussed, the present invention provides a process for producing an electroactive substrate, the process including:
  providing a substrate having an oxidant layer on a surface thereof;
  exposing the surface containing the oxidant layer to a vapour containing an aryl or heteroaryl monomer that is polymerizable to form an electroactive polymer; and
  polymerizing the aryl or heteroaryl monomer in the presence of a volatile Lewis base to form a polyaryl or polyheteroaryl electroactive polymer film on the surface of the substrate.

The substrate onto which the oxidant layer and the polyaryl or polyheteroaryl electroactive polymer film are formed can be any suitable substrate including, but not limited to, glass, plastics, ceramics, silicon, organosiloxanes, paper, paper laminates, cellulose, carbon fibre, metals, rubber, etc. In one embodiment the substrate is a glass substrate. In another embodiment, the substrate is a plastic substrate. The plastic may be selected from the group consisting of: polycarbonate, polyethylene, polypropylene, polystyrene, polytetrafluoroethylene, polyethylene terephthalate; polyethylene naphthalene dicarboxylate, tetrafluoroethylene-hexafluoropropylene copolymers, polyvinyl-difluoride, nylon, polyvinylchloride, copolymers of the aforementioned, and mixtures of the aforementioned. In another embodiment the substrate is a plastic glass, such as the material described in U.S. Pat. No. 6,638,454.

The substrate is coated with a conducting layer, such as an indium-tin oxide (ITO) layer, a fluorine doped tin oxide (FTO) layer, or an antinomy doped tin oxide (ATO) layer, to form an electrode.

The process may include a step of treating the substrate surface prior to deposition of the oxidant layer. The surface may be treated by cleaning with a detergent, water or a suitable solvent. Alternatively, or in addition, the surface may be treated by exposing the surface to air in a plasma chamber in order to activate the surface.

The substrate surface is coated with an oxidant layer. The oxidant layer may comprise a layer or coating containing any oxidant that is capable of oxidatively coupling aryl or heteroaryl monomers. In an embodiment the oxidant is a metal salt. Suitable metal salts are metal salts of main group or transition group metals. In an embodiment, the metal salt is a transition metal salt. The transition metal salt may be selected from the group consisting of salts of: iron(III), copper(II), chromium(VI), cerium(IV), manganese(IV), manganese(VII), ruthenium(III), and zinc(II).

The metal salt may be a salt of an inorganic or organic acid. Suitable salts of inorganic acids include: halides, such as $FeCl_3$; perchlorates, such as $Fe(ClO_4)_3$; phosphpates, such as $FePO_4$; sulphates, such as $Fe_2(SO_4)_3$. Suitable salts of organic acids include: salts of $C_1$-$C_{20}$-alkanesulphonic acids, such as methanesulphonic, ethanesulphonic, propanesulphonic, butanesulphonic, and higher sulphonic acids, e.g. dodecanesulphonic acid; salts of aliphatic perfluorosulphonic acids such as trifluoromethanesulphonic acid, perfluorobutanesulphonic acid, and perfluorooctanesulphonic acid; salts of aliphatic $C_1$-$C_{20}$-carboxylic acids such as 2-ethylhexylcarboxylic acid; salts of aliphatic perfluorocarboxylic acids such as trifluoroacetic acid or perfluorooctanoic acid; salts of unsubstituted or substituted arylsulphonic acids, such as benzenesulphonic acid, ethylbenzene sulphonic acid, 1,3,5-trimethylbenzene (mesityl) sulfonic acid, 2-4 xylenesulphonic acid, o-toluenesulphonic acid, p-toluenesulphonic acid, and dodecylbenzenesulphonic acid; salts of cycloalkanesulphonic acids such as camphorsulphonic acid; salts of the sulphuric monoesters of $C_1$-$C_{20}$-alkanoles, such as lauryl sulphate. The oxidant may also be a mixture of salts.

In an embodiment, the transition metal salt is an iron(III) salt of an arylsulphonic acid. In a specific embodiment the oxidant is iron(III) tosylate.

A solution of the oxidant in a suitable solvent is coated onto the substrate using standard solution coating techniques, such as dip coating, spray coating, spin coating, etc. In an embodiment, the solution is spin coated onto the substrate surface.

The solvent used in the oxidant solution may be any solvent in which the oxidant is soluble, and which can be readily removed from the substrate after the coating step. Suitable solvents include alcohols, such as methanol, ethanol, n-propanol, i-propanol, n-butanol. Other volatile organic solvents that could be used include acetone. In an embodiment the oxidant solution is a 40 wt % solution of the oxidant.

After coating the oxidant solution onto the surface of the substrate the solvent is removed to provide an oxidant layer on the surface of the substrate. It may not be necessary for all of the solvent to be removed from the substrate and, therefore, reference herein to the solvent being removed should not be taken to mean that all of the solvent is removed. Rather, there may be residual solvent remaining in the oxidant layer after the solvent removal step. However, the amount of residual solvent may need to be controlled so that the solvent does not interfere with the subsequent polymer film deposition step. The solvent may be removed by heating the coated substrate at a suitable temperature for a suitable period of time. Suitable temperatures and times may be about 50° C. to about 80° C. for a period of 30 seconds to 2 minutes. Alternatively, or in addition, the solvent may be removed by passing air over the coated substrate for a suitable period of time. The substrate is then mounted into a vacuum chamber or a sealed chamber without delay.

As previously discussed, exposure of the oxidant layer to water at any stage prior to the step of exposing the substrate having the oxidant layer to a vapour containing an aryl or heteroaryl monomer may be detrimental to the formation of the polyaryl or polyheteroaryl electroactive polymer films. It appears likely that the detrimental influence of water on the oxidant layer is a result of water initiating or otherwise assisting in the nucleation and/or formation of crystals in the oxidant layer. In turn, crystal formation has an influence on the homogeneity of the aryl or heteroaryl electroactive polymer film that is subsequently formed. For example, when the oxidant layer is a layer of iron (III) tosylate, we have found that there is a threshold value of humidity above which iron (III) tosylate crystallises. Specifically, samples of substrates coated with a iron (III) tosylate oxidant layer were kept for 30 minutes at atmospheric pressure in a sealed chamber. The humidity in the chamber was varied for different samples. For samples kept at 36% relative humidity (RH) and 46% RH, macroscopic fringes (which are the precursor stage for the formation of crystals) were observed. A sample kept at 28% RH did not contain any crystals. Another sample kept at 47% RH contained single crystal nuclei on less than 0.5% of the surface area. A sample kept at 48% RH had 1.0±0.5% area crystallised, another sample kept at 52% RH had 11.0±3.0% area crystallised, and a sample kept at 59.0% RH had 44.0±5.0% area crystallised.

Advantageously, addition of an amphiphilic polymer into the oxidant layer inhibits crystallisation of the oxidant and extends the range of humidity that can be tolerated in the polymerization step. Thus, the process of the present invention may include forming an oxidant layer containing an amphiphilic polymer on a surface of the substrate onto which an electroactive film is subsequently deposited. The surface containing the oxidant layer can then be exposed to a vapour containing the aryl or heteroaryl monomer under conditions to form the polyaryl or polyheteroaryl electroactive polymer film on the surface of the substrate. The exposure is carried out in the presence of water to assist the polymerization.

The oxidant layer can be formed on the surface of the substrate by: (i) coating the surface with an oxidant solution containing an oxidant, an amphiphilic polymer, and a solvent; and (ii) removing the solvent to form the oxidant layer containing the oxidant and the amphiphilic polymer.

The amphiphilic polymer may be a block copolymer or a random copolymer.

Depending on the structure of the amphiphilic polymer, it may be obtained commercially or it may be obtained, for example, by selecting a hydrophobic block segment and a hydrophilic block segment and then synthesizing the polymer.

The amphiphilic polymer is preferably relatively flexible so as to minimize any impact of the polymer on the formation of the oxidant layer on the substrate. Accordingly, the glass transition temperature (Tg) of the main chain of the amphiphilic polymer may be sub-ambient (i.e. less than about 22° C.). For ease of use, the Tg of the amphiphilic polymer will typically be less than about 0° C.

The amphiphilic polymer may be any polymer having hydrophilic and hydrophobic polymer segments. Amphiphilic polymers include: poly (alkylene glycol) polymers such as poly(ethylene glycol) (PEG) and poly(propylene glycol) (PPG), polyvinylpyrrolidone (PVP), and pluronic F68. The amphiphilic polymer may be a copolymer or a mixture of the aforementioned polymers. For example, di- or tri-block copolymers comprising a hydrophilic polymer segment and a hydrophobic polymer segment may be used. Alternatively, random copolymers comprising a hydrophilic polymer segment and a hydrophobic polymer segment may be used. The hydrophilic polymer may be poly(ethylene glycol). The hydrophobic polymer may be poly(propylene glycol), or a polyamino acid. In one embodiment, the amphiphilic polymer is a poly (alkylene glycol) copolymer. The poly(alkylene glycol) copolymer may be a random copolymer or a block copolymer comprising poly(ethylene glycol) and poly(propylene glycol). In specific embodiments the poly(alkylene glycol) copolymer is selected from the group consisting of: a poly(ethylene glycol)-poly(propylene glycol)-poly(ethylene glycol) (PEG-PPG-PEG) triblock polymer, a poly(propylene glycol)-poly(ethylene glycol)-poly(propylene glycol) (PPG-PEG-PPG) triblock polymer, and a poly(ethylene glycol-ran-propylene glycol) (PEG-ran-PPG) random copolymer. In an embodiment the polyoxyalkylene copolymer has a molecular weight of 1100 to 14600 Daltons. In a specific embodiment the polyoxyalkylene copolymer has a molecular weight of 2500 to 12000 Daltons. We have observed that higher molecular weight copolymers tend to give better results in terms of the resistivity of the polyaryl or polyheteroaryl electroactive polymer film. An amphiphilic polymer having a molecular weight of about 12000 may be particularly suitable.

The amount of amphiphilic polymer that is added to the oxidant solution can be varied. However, our results to date suggest that there is an upper limit to the amount of amphiphilic polymer that can be included in the oxidant solution. Thus, samples of substrates containing 0%, 5%, 10% and 15% poly(ethylene glycol-ran-propylene glycol) (PEG-ran-PPG) copolymer were prepared and a PEDOT film was formed at atmospheric pressure in a sealed chamber at 47% RH. The resistivity of each sample was then determined. The resistivities were 715±30 Ohms/cm$^2$ for 0% PEG-ran-PPG added to oxidant, 130±10 Ohms/cm$^2$ for the 5% sample, 450±40 Ohms/cm$^2$ for the 10% sample, and 2030±160 Ohms/cm$^2$ for the sample with 15% of PEG-ran-PPG added. At the higher concentrations, PEG-ran-PPG may inhibit polymerization of PEDOT, or prevent efficient polymer compaction during the oxidant washing phase (described later). Therefore, the amount of amphiphilic polymer in the oxidant solution may be between 0 wt % and 15 wt %. At this stage a concentration of between about 0% and about 5% appears optimal. However, it will be appreciated that the optimal amount of amphiphilic polymer may depend on the actual polymer used. The optimal amount of any amphiphilic polymer can be determined by the skilled person using the methods described herein.

Without intending to be bound by any particular theory, our results indicate that the amphiphilic polymer may play several roles during the vapour phase polymerization. Firstly, the addition of amphiphilic polymer may provide steric hindrance within the oxidant layer, which inhibits crystallisation of the oxidant due to water absorption. The oxidant Fe(II) tosylate has a high affinity for water absorption and tends to crystallise when water is present. Crystallised oxidant does not participate in the polymerisation process. Therefore, the amphiphilic polymer effectively traps any water in the oxidant layer and/or any extraneous water so that the water is not able to effect nucleation and/or crystallisation of the oxidant in the oxidant layer. Thus, the amphiphilic polymer effectively "stabilises" the oxidant layer in a form that is particularly suitable for the subsequent monomer polymerization step. Furthermore, the amphiphilic polymer may also act as a moderator during polymerisation in a similar manner to other "base" inhibited processes.

Figure 14:
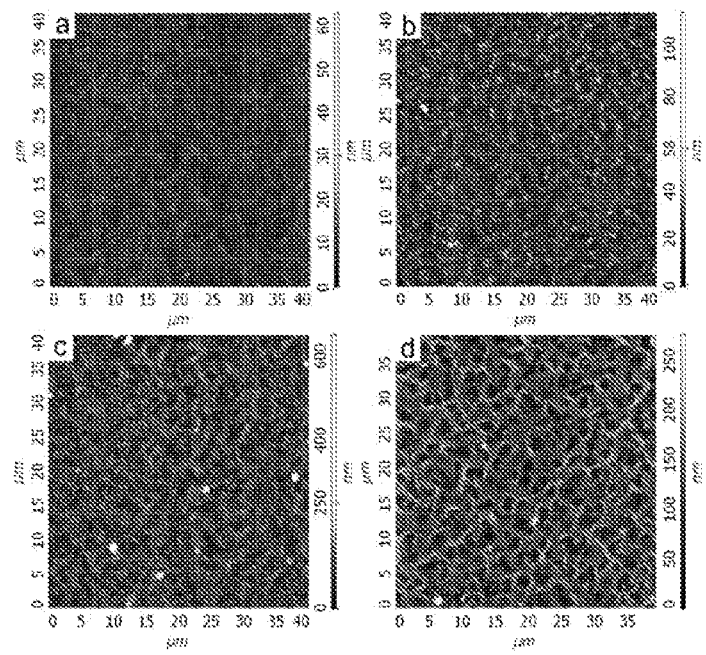
FIG. 14 is a series of microphotographs of PEDOT films produced from low (a) to high (d) relative humidity levels.
Figure 15:
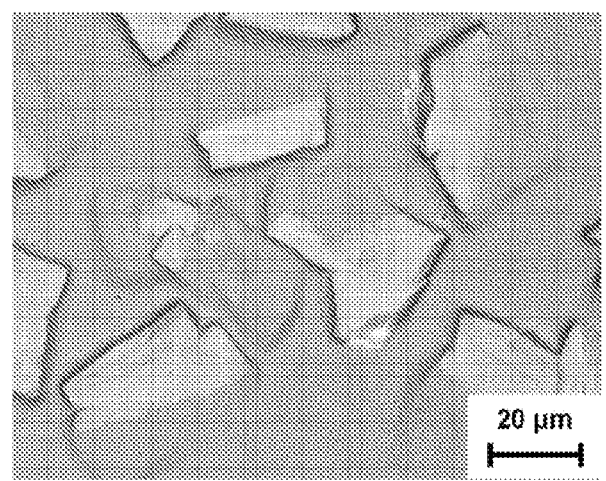
FIG. 15 is a microphotographs showing the formation of PEDOT film. The "icebergs" are regions of crystallised Fe(II) tosylate oxidant.

FIG. 14 shows AFM (atomic force microscopy) images of PEDOT films produced at low (a) to high (d) relative humidity levels. Without the addition of amphiphilic polymer, the resulting films have a high number of pin-hole defects which may affect the film quality and conductivity. FIG. 15 shows the formation of PEDOT film. The "icebergs" are regions of crystallised Fe(II) tosylate oxidant. No PEDOT film is formed in these regions. The amphiphilic polymer inhibits crystallisation of the oxidant.

The oxidant is a Lewis acid in that it has a high affinity for free electron pairs. The amphiphilic polymer is a Lewis base due to the oxygen content in the polymer backbone. The oxygen content in the polymer provides the free electron pairs. It is therefore possible that the amphiphilic polymer co-ordinates with the Fe(III) ions of the oxidant and effectively reduces the reactivity of the oxidant. This action may then moderate the polymerization rate which then enables the formation of polyaryl or polyheteroaryl electroactive polymer films having improved conductivity.

Figure 16:
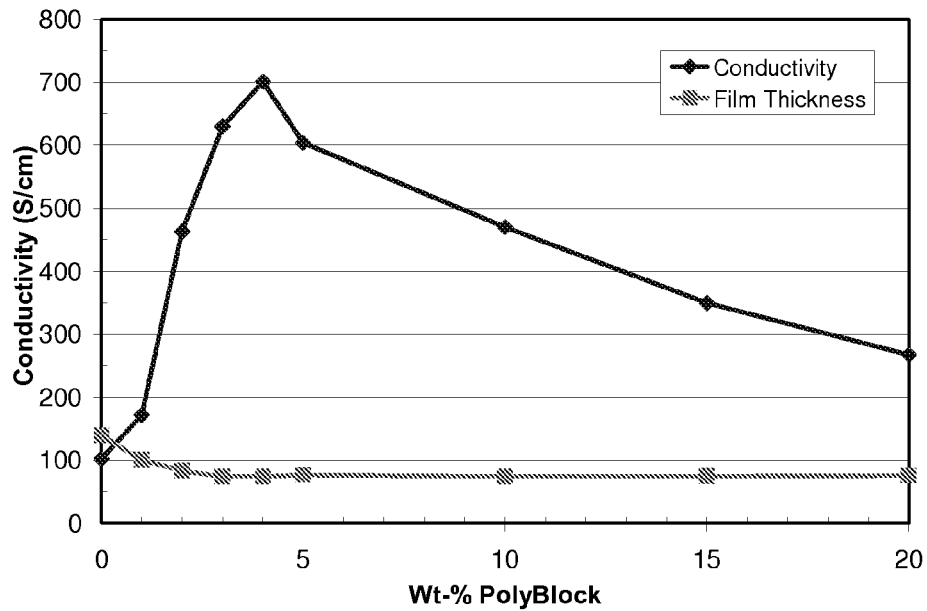
FIG. 16 is a plot of weight % amphiphilic polymer vs conductivity (S/cm) for sample prepared according to an embodiment of the present invention.

As shown in FIG. 16, our results suggest the optimum amount of amphiphilic polymer added to a solution of Fe(II) tosylate is 4 wt %. The Fe(II) tosylate solution used was 16 wt % Fe(II) tosylate in 84 wt % butanol. The weight ratio of tosylate to amphiphilic polymer is 4:1. Any increase in conductivity of the polyaryl or polyheteroaryl electroactive polymer film may be explained in terms of the moderating effect of the amphiphilic polymer producing polyaryl or polyheteroaryl electroactive polymer films with fewer defects. The decline in conductivity after 4 wt % may be due to too high a moderating effect reducing the ability of the tosylate to sustain the polymerisation process. It is likely, under these conditions, that shorter polyaryl or polyheteroaryl electroactive polymer chains are formed. Additionally, it is possible that some of the amphiphilic polymer may remain after rinsing and that the remaining amphiphilic polymer acts as an insulator between the polyaryl or polyheteroaryl electroactive polymer grains.

Figure 17:
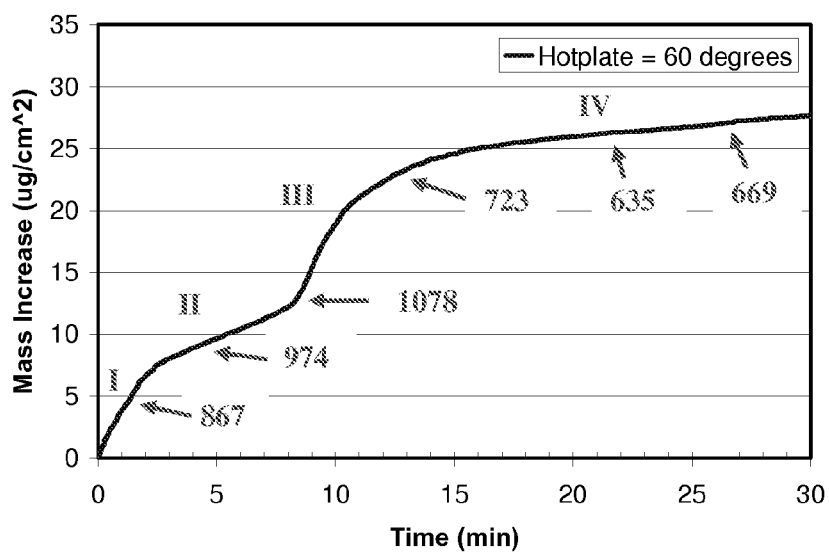
FIG. 17 is a plot of time (min) vs mass increase ($\mu g/cm^2$) for samples prepared according to an embodiment of the present invention.

Too high a polymerisation rate produces polyaryl or polyheteroaryl electroactive polymer films with reduced conductivity. FIG. 17 shows a typical polymerisation kinetics curve for the vapour phase polymerization process of the present invention. It shows four distinct phases (I-IV) in an "S" curve. Each phase has a distinct polymerisation rate and this rate influences the conductivity of the film. Highlighted in the figure is the overall conductivity of the film as the film thickness increases during polymerisation. However, the actual conductivity of the film as the polymerisation progresses is more dramatic. For example, to produce an overall conductivity of 974 S/cm in the middle of phase II, the conductivity of the film formed after phase I (876 S/cm) must have been 1098 S/cm. So between the end of phase I and up to half way through phase II the polymerisation process was producing a film with a conductivity of 1098 S/cm. The data are shown in Table 1.

TABLE 1

Conductivity of polyaryl or polyheteroaryl electroactive polymer films at different polymerization phases.

| Location along kinetic curve | Conductivity (S/cm) |
|---|---|
| Beginning to end of phase I | 867 |
| End phase I to half way point of phase II | 1098 |
| Half way point phase II to end of phase II | 1196 |
| End phase II to end phase III | 428 |
| End phase III to half way point phase IV | 276 |
| Half way point phase IV to end phase IV | 402* |

*The film undergoes a certain amount of compaction in this last phase which on occasions results in a small decease in film thickness. This produces an effective increase in conductivity for the last section of phase IV.

Figure 18:
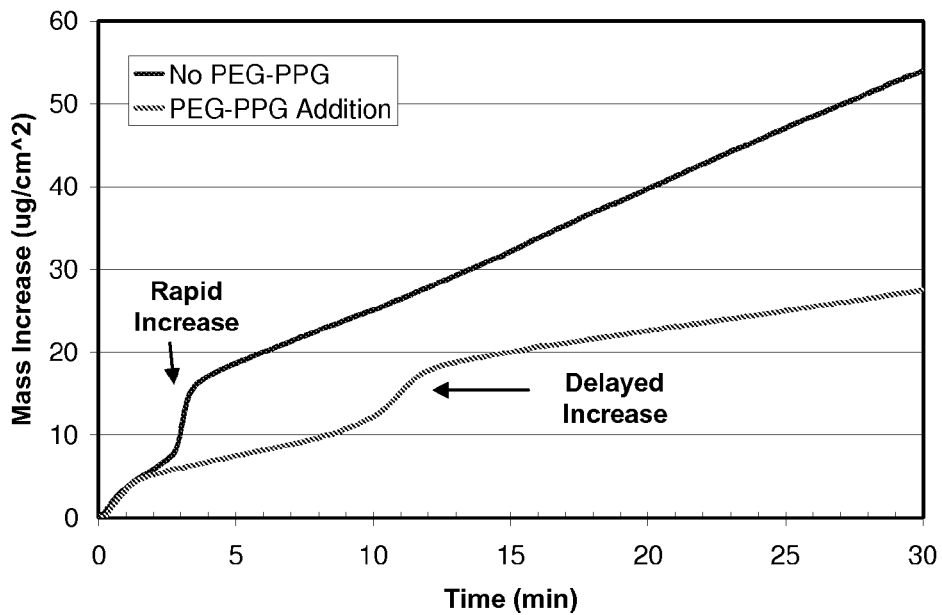
FIG. 18 is a plot of time (min) vs mass increase ($\mu g/cm^2$) for samples prepared according to an embodiment of the present invention.

As shown in FIG. 18, the addition of the amphiphilic polymer may also delay the onset of the more rapid mass increase or "kick" which is a feature of the vapour phase polymerization process. This more rapid mass increase results in a rapid increase in polymer film thickness but this also phase produces the poorest conductivity polyaryl or polyheteroaryl electroactive polymer films. By delaying the more rapid mass increase and extending the slow kinetic rate it is possible to produce polyaryl or polyheteroaryl electroactive polymer films with higher conductivity. It is also possible to control the onset of the rapid mass increase by altering the polyaryl or polyheteroaryl monomer concentration during polymerisation but very small changes in concentration affect the polymerization process. However, by adding the amphiphilic polymer we are able to achieve a level of control that is able to tolerate relatively large fluctuations in polyaryl or polyheteroaryl monomer concentrations.

Our work has shown that terminating the vapour phase polymerization process at the 15 minute mark instead of allowing the process to continue for a full 30-40 minutes resulted in a significant increase in conductivity (regularly exceeding 1000 S/cm). Further studies using quartz crystal microscopy confirmed that polymer growth during the vapour phase polymerization process undergoes four distinct phases, as shown in FIG. 17. Phase II produces the highest conductivity polyaryl or polyheteroaryl electroactive polymer films and ideally the longer this phase is maintained the better the polyaryl or polyheteroaryl electroactive polymer films. Phase III produces poorer conductivity polyaryl or polyheteroaryl electroactive polymer films and ideally one would wish to suppress this from occurring.

Our results also indicate that the vapour pressure of the polyaryl or polyheteroaryl monomer affects the quality of the polyaryl or polyheteroaryl electroactive polymer film. For example, our results show that two samples mounted side by side in a polymerization chamber may undergo different polymerisation rates under what appear to be "identical" experimental conditions. Specifically, our results showed that:

If the polyaryl or polyheteroaryl monomer vapour pressure was significantly above the minimum critical pressure then all samples would produce a polymerisation curve as shown in FIG. 17.

If the polyaryl or polyheteroaryl monomer pressure was marginal then one or two samples would undergo a rapid mass increase and this would deplete the polyaryl or polyheteroaryl monomer vapour to the point that the other samples would not undergo a rapid mass increase.

If the polyaryl or polyheteroaryl monomer pressure was below the minimum then this became the rate limiting step in the process and all the samples would not undergo a rapid mass increase and polymerisation rate would be slow.

As shown in FIG. 18, addition of amphiphilic polymer delays the onset of the rapid mass increase enabling better polyaryl or polyheteroaryl electroactive polymer films to form. The addition of amphiphilic polymer does not prevent the rapid mass increase but delays it.

Figure 19:
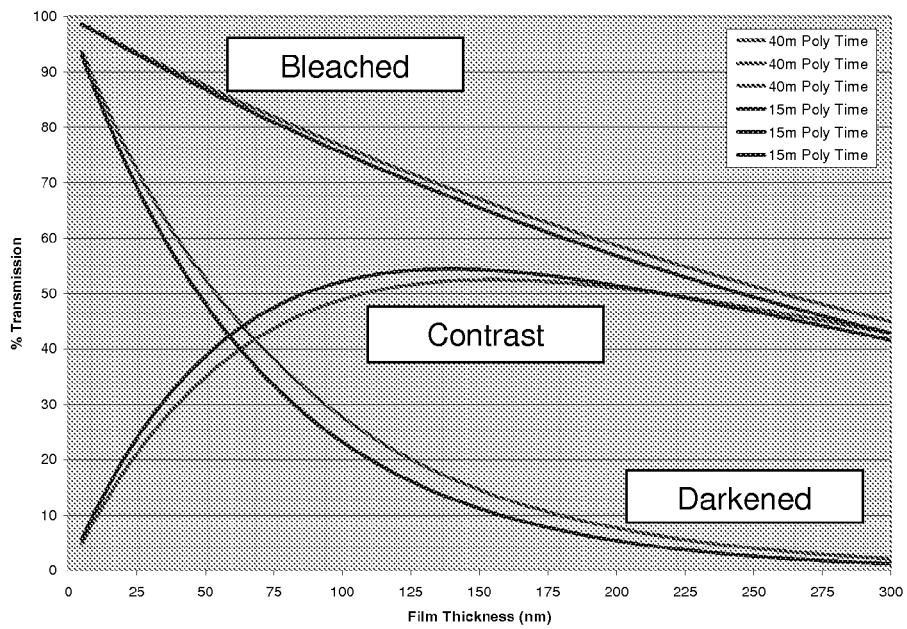
FIG. 19 is a plot of film thickness (nm) vs transmission (%) for an electrochromic window according to an embodiment of the present invention.

FIG. 19 shows the results between terminating the vapour phase polymerization process at 15 minutes and letting it run to 40 minutes. By terminating at 15 minutes the rapid mass increase is avoided and this produces the best quality polyaryl or polyheteroaryl electroactive polymer film. The result is in an increase in contrast range of about 2% from a maximum of 52.5% to 54.4%. At about 70 nm film thickness, which is the film thickness that is required for many applications, the increase is in % Tx range is slightly less than 4% from 42.3% to 46.1%.

The polyaryl or polyheteroaryl electroactive polymer film is formed by exposing the surface containing the oxidant layer to a vapour containing an aryl or heteroaryl monomer that is polymerizable to form an electroactive polymer. The exposure is carried out under conditions to form the polymer on the surface of the substrate. The exposure is also carried out in the presence of the volatile Lewis base.

The vapour phase polymerization of aryl or heteroaryl monomers, such as EDOT, can be carried out at atmospheric pressure in a sealed chamber or at reduced pressure in a vacuum chamber. Thus, the step of exposing the surface containing the oxidant layer to a vapour containing an aryl or heteroaryl monomer may include placing the substrate having the oxidant layer on the surface in a chamber, sealing the chamber, introducing a vapour containing the aryl or the heteroaryl monomer into the chamber, and maintaining the substrate at a temperature suitable for polymerization of the aryl or the heteroaryl monomer so as to form a polymer film on the surface.

A suitable vacuum chamber arrangement is shown in FIG. 1. The chamber 10 is a sealable glass pressure vessel 12 having a base 14 and a removable top section 16. A vacuum dessicator is a suitable vessel 12 for small scale work, whilst larger vessels 12 can be purpose built for manufacturing substrates for use in larger scale electrochromic devices, such as windows.

The temperature of the monomer 22, Lewis base 24 (e.g. water) and substrate 20 is individually controlled with thermoelectric devices 18. The temperature can be monitored using thermocouples (not shown) mounted onto the surface of each thermoelectric device 18. Individual control of temperature allows the partial pressure of the monomer and Lewis base to be varied as well as providing control of the temperature of the substrate. The chamber 10 is in fluid connection with a pump 26 which allows the pressure in the chamber to be reduced as required. A pressure gauge 28 is used to monitor the pressure in the chamber 10. In use, the temperature of the substrate 20 is raised to the desired value (usually about 25° C. to about 40° C.), the chamber is pumped down to a desired pressure (usually about 1 mBar) and the temperatures of the monomer and Lewis acid are then raised to their desired values.

A sealed chamber could be used instead of the vacuum chamber 10. The sealed chamber will be of similar configuration to the vacuum chamber 10, but without the pump 26.

The temperature of the substrate during formation of the electroactive polymer is maintained at about 25 degrees Celsius to about 40 degrees Celsius. In specific embodiments of the invention the temperature of the substrate during formation of the electroactive polymer is maintained at about 25 degrees Celsius to about 35 degrees Celsius, about 26 degrees Celsius to about 34 degrees Celsius, about 27 degrees Celsius to about 33 degrees Celsius, about 28 degrees Celsius to about 32 degrees Celsius, or about 29 degrees Celsius to about 31 degrees Celsius. In a specific embodiment the temperature of the substrate during formation of the electroactive polymer is maintained at about 30 degrees Celsius. The temperature of the substrate during formation of the electroactive polymer may affect the quality of the polymer film that is formed. Higher substrate temperatures are expected to increase the rate of the polymerization reaction and, hence, the rate of polymer formation. Counter to this however, the substrate temperature may also affect the amount of water that is available adjacent the surface of the substrate where the polymerization takes place.

The electroactive polymer may be selected from the group consisting of:

polyaryl polymers, such as polyphenylene, polyphenylenesulfide, polyaniline, polyquinone, polyfluorene, polyanthraquinone, poly-1,4-phenylene vinylene (PPV), and 2-methoxy-5-ethylhexyloxy poly-1,4-phenylene vinylene (MEH-PPV);

polyheteroaryl polymers, such as polythiophene (PTh), polypyrrole (PPy), polyfuran (Pfu), polycarbazole (PCz), poly-3,4-ethylenedioxythiophene (PEDOT), poly(3,4-propylenedioxythiophene (ProDOT), poly-3,4-(2,2-dimethylpropylene)dioxythiophene (ProDOT-Me$_2$), poly-3,4-ethylenedioxypyrrole (PEDOP), poly-3,4-propylenedioxypyrrole (ProDOP), poly-N-(3-sulfonatopropoxy)-3,4-propylenedioxypyrrole (PProDOP-NPS), poly-1,2-bis(2-ethylenedioxythienyl) vinylene (PBEDOT-V), poly-1,2-bis(2-propylenedioxythienyl)vinylene (PProDOT-V), poly-2,5-bis(2-ethylenedioxythienyl)pyridine (PBEDOT-Pyr), poly-1,4-bis(2ethylendioxythienyl)-2,5-didodecyloxybenzene (PBEDOT-B(OC$_{12}$H$_{25}$)$_2$), poly-3-methylthiophene (P3MTh), poly-2,5-(2-ethylenedioxythienyl)furan (PBEDOT-Fu), poly-4,4'-(2-ethylenedioxythienyl)biphenyl (PBEDOT-BP), poly-3,6-(2-ethylenedioxythienyl)carbazole (PBEDOT-Cz), poly-3-butylthiophene (P3BTh), alkyl poly-3,4-ethylenedioxythiophene (PEDOT-alkyl), aryl poly-3,4-ethylenedioxythiophene (PEDOT-aryl), poly-2,5-(2-thienyl)pyrrole (PSNS), polyviologen (PV), poly-metal phthalocyanines (PM Phth), poly-5,5'-biethylenedioxythiophene (PBiEDOT), poly-1,2-(2-ethylene dioxythienyl) cyanovinylene (PBEDOT-CNV), poly-1,2-(2-thienyl)cyanovinylene (PBTh-CNV), poly[2,5-bis(2ethylenedioxythienyl)-diphenylpyridopyrazine] (PBEDOT-PyrPyr(Ph)$_2$), polythiopehenvinylene, polythiazole, poly(p-pyridine), poly(p-pyridalvinylene), and polyindole;

and deriviatives of any of the aforementioned.

A range of electroactive polymers that may be formed using the processes of the present invention are described in: (i) Gustafsson, J. C. et al, *Solid State Ionics* 1994, 69, 145-152; (ii) *Handbook of Oligo- and Polythiophenes* 1999, Ch 10.8, Ed D Fichou, Wiley-VCH, Weinhem; (iii) Schottland, P. et al, *Macromolecules,* 2000, 33, 7051-7061; (iv) Onoda M., *Journal of the Electrochemical Society* 1994, 141, 338-341; (v) Chandrasekar, M., *Conducting Polymers, Fundamentals and Applications, a Practical Approach* 1999, Kluwer AcademicPublishers, Boston; (vi) Epstein, A. J. et al, *Macromol Chem, Macromol Symp* 1991, 51, 217-234.

In an embodiment the electroactive polymer is a poly-3,4-substitutedthiophene of Formula (I):

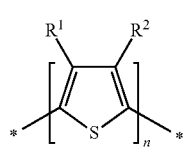

(I)

wherein $R^1$ and $R^2$ are each independently selected from the group consisting of: H, halogen, OH, $NO_2$, cyano, $NH_2$, optionally substituted $C_1$-$C_{12}$ alkyl, optionally substituted $C_1$-$C_{10}$ heteroalkyl, optionally substituted $C_3$-$C_{12}$ cycloalkyl, optionally substituted $C_1$-$C_{12}$ heterocycloalkyl, optionally substituted $C_6$-$C_{18}$ aryl, optionally substituted $C_1$-$C_{18}$ heteroaryl, optionally substituted $C_1$-$C_{12}$ alkyloxy, optionally substituted $C_2$-$C_{12}$ alkenyloxy, optionally substituted $C_2$-$C_{12}$ alkynyloxy, optionally substituted $C_1$-$C_{10}$ heteroalkyloxy, optionally substituted $C_3$-$C_{12}$ cycloalkyloxy, optionally substituted $C_3$-$C_{12}$ cycloalkenyloxy, optionally substituted $C_1$-$C_{12}$ heterocycloalkyloxy, optionally substituted $C_1$-$C_{12}$ heterocycloalkenyloxy, optionally substituted $C_6$-$C_{18}$ aryloxy, optionally substituted $C_1$-$C_{18}$ heteroaryloxy, optionally substituted $C_1$-$C_{12}$ alkylamino, $SR^3$, $SO_3H$, $SO_2NR^3R^4$, $SO_2R^3$, $SONR^3R^4$, $SOR^3$, $COR^3$, $COOH$, $COOR^3$, $CONR^3R^4$, $NR^3COR^4$, $NR^3COOR^4$, $NR^3SO_2R^4$, $NR^3CONR^4R^5$, $NR^3R^4$, and acyl; and $R^3$, $R^4$ and $R^5$ are independently selected from the group consisting of H and $C_1$-$C_6$-alkyl.

In an embodiment the electroactive polymer is a poly-3,4-alkylenedioxythiophene, such as, but not limited to: poly-3,4-methylenedioxythiophene; poly-3,4-methylenedioxythiophene derivatives; poly-3,4-ethylenedioxythiophene; poly-3,4-ethylenedioxythiophene derivatives; poly-3,4-propylenedioxythiophene; poly-3,4-propylenedioxythiophene derivatives; poly-3,4-butylenedioxythiophene; poly-3,4-butylenedioxythiophene derivatives; and copolymers of any of the aforementioned.

In a specific embodiment the electroactive polymer is poly-3,4-ethylenedioxythiophene (PEDOT).

In another specific embodiment the electroactive polymer is poly-3,4-propylenedioxythiophene (PRODOT).

The volatile Lewis base that is present during the vapour phase polymerization assists in the formation of conjugated polyaryl or polyheteroaryl polymer chains and, hence, polymer films that have good conductivity. It has previously been suggested that EDOT (and other aryl and heteroaryl monomers) are oxidatively polymerized via a mechanism that involves dimerisation of aryl or heteroaryl radicals formed under the oxidative conditions. Once dimerisation occurs, two hydrogen atoms need to be extracted from each aryl or heteroaryl unit in the polymer chain in order for the conjugation to be restored. Without intending to be bound by theory, we propose that the presence of the volatile Lewis base during the polymerization stage assists in proton abstraction.

The volatile Lewis base may be any molecule or ion that is capable of accepting a hydrogen ion ($H^+$). The volatile Lewis base may be selected from the group consisting of: amine containing compounds, carbonyl containing compounds, aromatic heterocyclic compounds, hydroxyl containing compounds, ether containing compounds, ammonia and water.

The volatile Lewis base is preferably a relatively volatile liquid. As used herein, "volatile" means that the volatile Lewis base has a boiling point of less than about 220° C. under use conditions. In one embodiment, the boiling point of the volatile Lewis base is less than about 150° C., more specifically from about 30 to about 150° C. In a specific embodiment the boiling point of the volatile Lewis base is about 35 to about 100° C.

Examples of amine containing compounds that may act as volatile Lewis bases include: alkylamines, such as methyl amine, cyclohexylamine, tetrahydrofurfurylamine, etc; dialkylamines, such as diethylamine, diisopropylamine, dipropylamine, dibutylamine, etc; trialkyl amines, such as triethylamine, diisopropylethylamine, allylmethylamine, etc; heterocyclic amines, such as pyrrolidine, piperidine, tetrahydroquinoline, morpholine, piperazine, 1,2,3,4-tetrahydroisoquinoline; aryl amines, such as benzylamine, aniline, etc; aralkylamines, such as 1,8-bis(dimethylamino)-naphthalene, etc; diamines, such as 2-(ethylamino)ethanol, N,N-dimethylethylene diamine, N,N'-dimethylethylene diamine, ethylene diamine, 1,1-dlmethyl-hydrazine, etc.

Examples of carbonyl containing compounds that may act as volatile Lewis bases include: aldehydes, such as acetaldehyde, n-butylaldehyde, benzaldehyde, acrolein, etc; ketones, such as acetone, methyl ethyl ketone, acetophenone, acetylacetone, etc; esters, such as ethyl acetate, butyl acetate, methyl propionate, ethyl acrylate, butyrolactone, ethyl acetoacetate, etc; amides such as dimethylformamide, diethylacetamide, butyrolactam, 2-pyrrolidone, 2-oxazolidone, hexamethyl phosphoramide, etc; carboxylic acids, such as acetic acid, propionic acid, benzoic acid, etc; polymers and oligomers each having a carbonyl group.

Examples of aromatic heterocyclic compounds that may act as volatile Lewis bases include: pyridine, 2,6-di-tert-butylpyridines, 2-picoline, 3-picoline, 4-picoline, 2,3-cyclohexenopyridine, and 2-(methylamino)pyridine.

Examples of hydroxyl containing compounds that may act as volatile Lewis bases include: saturated or unsaturated aliphatic alcohols, such as methanol, ethanol, n-propanol, i-propanol, n-butanol, s-butanol, t-butanol, octadecyl alcohol, 1,2-butylene glycol, 1,3-propylene glycol, 1,4-butanediol, 1,6-hexane diol, etc; aromatic alcohols, such as benzyl alcohol, etc; phenols, such as phenol, 2,6-di-tert-butyl-4-methylphenol, etc.

Examples of ether containing compounds that may act as volatile Lewis bases include: dimethyl ether, diethyl ether, diisopropyl ether, etc.

In an embodiment the volatile Lewis base is water. Water is attractive for use as the Lewis base because it is cheap, easy to handle, readily available, etc. When using water as the Lewis base consideration also needs to be given to our finding that exposure of the oxidant layer to water during deposition of that layer and handling of the oxidant layer coated substrate can lead to a reduction in the electrical properties in the polyaryl or polyheteroaryl electroactive polymer film that is subsequently deposited. Thus, there is a balance between minimising exposure of the oxidant layer to water prior to exposure to the monomer vapour, and then adding water during deposition of the monomer onto the surface in order to promote polymerization. Controlling the level of water and the arrival rate of additional water to the oxidant layer provides a method for the formation of high conducting polyaryl or polyheteroaryl electroactive polymer films, such as PEDOT films.

To minimise the interference of water with the oxidant layer, the surface of the substrate may be coated with an anhydrous oxidant containing an oxidant and a solvent. The solvent may then be removed to form an oxidant layer on the surface. Exposure of the oxidant layer on the surface to water vapour may then be minimised prior to the step of exposing the surface containing the oxidant layer to a vapour containing an aryl or heteroaryl monomer.

When the step of exposing the surface containing the oxidant layer to a vapour containing an aryl or heteroaryl monomer is carried out at reduced pressure and the Lewis base is water the vapour pressure of the water in the vacuum chamber may be about 5 mBar to about 30 mBar (inclusive). In another embodiment the vapour pressure of the water in the vacuum chamber is greater than 15 mBar.

When the step of exposing the surface containing the oxidant layer to a vapour containing an aryl or heteroaryl monomer is carried out at atmospheric pressure in a sealed chamber and the Lewis base is water the relative humidity in the chamber may be about 10% to about 70% at a temperature of about 33° C. However, we have found that at relative humidity levels below 50% the electrical properties of the electroactive polymer are diminished as a result of insufficient water vapour being presented to the oxidant rich surface. Additionally for longer polymerisation times, water vapour negatively impacts on the oxidant surface due to crystal formation. We have obtained no film formation at relative humidity of 12%, a film having a resistivity of 400 Ohms/cm$^2$ at a relative humidity of 50%, and a film having a resistivity of 200 Ohms/cm$^2$ at a relative humidity of 60%.

The water that is present during the polymerization stage may be water that is otherwise "stored" in the oxidant layer, such as in the amphiphilic polymer in the oxidant layer. Thus, the water for the polymerization reaction may be made available by loading the amphiphilic polymer with water. Thus, the process of the present invention may include:
coating the surface of the substrate with an oxidant solution, the solution containing the oxidant, a hydrated amphiphilic polymer, and a solvent; and
removing the solvent to form the oxidant layer containing the oxidant and the hydrated amphiphilic polymer.

The hydrated amphiphilic polymer may contain water in an amount of about 0.01 wt % to about 2 wt % (inclusive). However, the optimum amount of water will depend on the amphiphilic polymer used.

The water that is loaded into the hydrated amphiphilic polymer may be sufficient to drive the polymerization step. Thus, reference to the polymerization of the aryl or heteroaryl monomer 'in the presence of a volatile Lewis base' specifically includes cases where the Lewis base is 'stored' in the oxidant layer. Alternatively, the vapour containing the aryl or heteroaryl monomer may also contain water vapour but the relative humidity or vapour pressure required for polymerization may be reduced.

Figure 4:
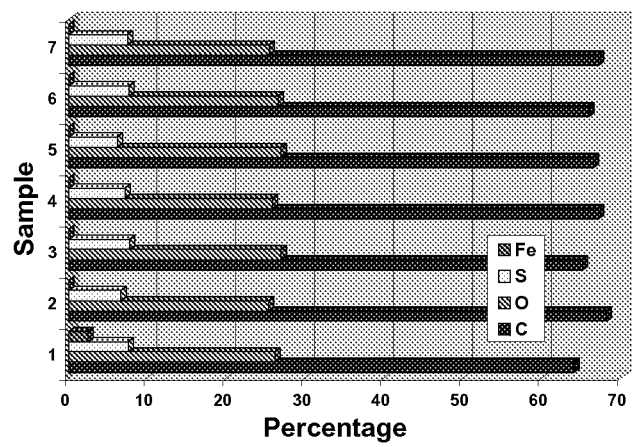
FIG. 4 is a plot of elemental percentage vs sample number of XPS elemental data for electrochromic substrates containing PEDOT films according to an embodiment of the present invention using various wash techniques. Sample numbers are as follows: (1) As received, non-washed; (2) Ethanol spray, substrate spinning: duration 5 minutes; (3) Ethanol spray, substrate spinning: duration 15 minutes; (4) Water spray, substrate spinning: duration 15 minutes; (5) Water bath: duration 15 minutes plus final spray rinse; (6) Ethanol bath: duration 5 minutes plus final spray rinse; (7) Ethanol bath: duration 15 minutes plus final spray rinse.
Figure 5:
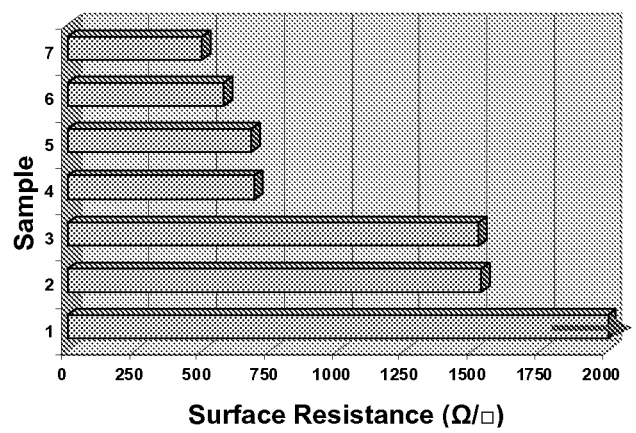
FIG. 5 is a plot of surface resistance ($\Omega/cm^2$) vs sample number for the samples analysed in FIG. 4. Surface resistance ($\Omega/cm^2$) for the non-washed (sample 1) and washed (samples 2-7) as per FIG. 4. Non-washed (sample 1) gave the highest resistance, 100 k$\Omega/cm^2$ and (sample 7) the ethanol bath: duration 15 minutes plus final spray rinse gave the lowest resistance, 500 $\Omega/cm^2$.

After the vapour phase polymerization process has finished the newly formed polymer film may be washed with a solvent to remove any spent oxidant and/or unreacted monomer remaining within the polymer matrix, thereby allowing for compaction of the electroactive polymer film. A decrease in film thickness of 80% was typically seen for the PEDOT films synthesised. Suitable wash methods include spraying the substrate containing the polymer film with a solvent for a period of about 1 to about 30 minutes. Alternatively, the substrate containing the polymer film may be dipped in to a bath containing the solvent for a period of about 1 to about 30 minutes. Suitable solvents include (but are not limited to): lower alkyl alcohols, such as methanol, ethanol, n-propanol, i-propranol, etc; water. A 15 minute ethanol or water bath or an ethanol or water spray rinse may be particularly suitable. FIG. 4 shows the XPS elemental analysis of samples after washing with water or ethanol. The figure shows that the amount of Fe (predominately from the iron(III) tosylate oxidant) remaining in the polymer film after washing is negligible. As shown in FIG. 5, there is a drop in the surface resistance of the substrates after washing. The drop in resistivity of the films after washing can be explained in terms of better inter-polymer chain connectivity as the spent material is removed and the polymer collapses on itself producing an interconnected network.

Optionally, one or more additives may be included in the polyaryl or polyheteroaryl electroactive polymer film. The additive(s) can be introduced in to the polymer film by washing the polymer film with a solution containing the additive (as described by Winther-Jensen et al., *Polymer* 2005, 46, 4664-4669). Alternatively, the additive(s) can be added to the oxidant layer at the time of coating the oxidant layer on to the substrate.

Additives that can be included in the polymer film include: conductive agents, electrolytes, redox agents, coloring agents, UV stabilizing agents, adhesion promoting agents, heat stabilizing agents, anti-oxidizing agents, flame retarding agents, polymers, electrochromic liquids, and combinations thereof. The type and quantity of the additive used will depend upon the specific application of the resulting electrochromic substrate.

Conductive agents that can be added to the polyaryl or polyheteroaryl electroactive polymer film include, but are not limited to, tin oxide particles, indium tin oxide (ITO) particles, antinomy doped tin oxide (ATO) particles, polythiophene, nickel oxide, polyvinylferrocene, polyviologen, tungsten oxide, iridium oxide, molybdenum oxide, Prussian blue (ferric ferrocyanide), etc can be added to the polyaryl or polyheteroaryl electroactive polymer film to improve the conductivity of the film. Other additives known to improve the conductivity of electrochromic films could also be used.

Electrolytes can be included in the polyaryl or polyheteroaryl electroactive polymer film to assist or enhance the conductivity of the electrical current passing therethrough. Suitable electrolytes include, but are not limited to, tetraethylammonium perchlorate, tetrabutylammonium tetrafluoroborate, tetrabutylammonium hexafluorophosphate, tetrabutylammonium trifluoromethane sulfonate, lithium salts and combinations thereof.

Redox active agents can be included in the polyaryl or polyheteroaryl electroactive polymer film. Any suitable antioxidant or antireductant may be used. For example, organic substances like vitamin C, alcohols, polyalcohols or sugars could be used. Alternatively, or in addition, inorganic substances like salts including species that may be oxidised (e g Fe to Fe3+, Sn2+ to Sn4+), metal clusters (e g a Cu cluster or a Fe cluster), salts comprising species that may be reduced (e g Fe to Fe2+, Sn4+ to Son2+), or metal organic complexes like ferrocenes, phthalocyanines, and metalloporphyrines.

Coloring agents that can be added to the polyaryl or polyheteroaryl electroactive polymer film include, but are not limited to, phenol red, Xylene Cyanol FF, thymol blue, m-cresol purple, cresol red, phthalocyanine blue, etc. For example, a blue-tinted electrochromic mirror may be prepared by introducing a stable coloring agent, such as "NEOZAPON" BLUE™ 807 (a phthalocyanine blue dye, available commercially from BASF Corp.) or "NEOPEN" 808 (a phthalocyanine blue dye, available commercially from BASF Corp.) into the polyaryl or polyheteroaryl electroactive polymer film.

Stabilizers that can be added to the polyaryl or polyheteroaryl electroactive polymer film include, but are not limited to, UV stabilizers. The UV stabilizer can be any compatible UV absorbing compound chosen from the large number of compounds well known in the art. Examples of classes of UV absorbing compounds that can be used include: benzoxazinones; benzotriazoles; triazines; diphenylcyanoacrylates; and derivatives thereof. Examples of UV absorbers include, but are not limited to, Cyagard 1164L, Cyagard 3638, Cyagard UV 531, Cyagard UV 5411, Cyagard UV 9, Cyasorb 1084, Cyasorb 1164, Cyasorb 284, Cyasorb UV 1988, Cyasorb UV 2098, Cyasorb UV 2126, Cyasorb UV 24, Cyasorb UV 2908 (Cyasorb is a trademark owned by Cytec Technology Corp.); Eastman Inhibitor RMB (Resorcinol Monobenzoate, available through Bio-Rad); Givsorb UV-1, Givsorb UV-2, Givsorb UV-13, Givsorb UV-14, Givsorb UV-15, Givsorb UV-16 (Givsorb is a trademark registered to Givaudan Corporation); Mark 1535, Mark 446 (available through Bio-Rad), Maxgard 200, Maxgard 800 (Maxgard is a trademark registered to Garrison Industries, Inc.); Norbloc 6000, Norbloc 7966 (Norbloc is a trademark registered to Johnson & Johnson); Quercetin; Sanduvor 3206, Sanduvor EPU, Sanduvor VSU (Sanduvor is a trademark registered to Sandoz Ltd.); Seesorb 201 (phenyl salicylate); Syntase 1200 (Neville-Synthese Organics, Inc.), THPE BZT, Tinuvin P (2-(2'-Hydroxy-5'-methylphenyl)benzotriazole 2-(2H-Benzotriazol-2-yl)-4-methylphenol 2-(2H-benzotriazol-2-yl)-p-cresol), Tinuvin 123, Tinuvin 171, Tinuvin 5055, Tinuvin 5151, Tinuvin 99-2, Tinuvin 144, Tinuvin 292, Tinuvin 384-2, Tinuvin 5050, Tinuvin 5060, Tinuvin 99, Tinuvin 109, Tinuvin 1130, Tinuvin 120, Tinuvin 1545, Tinuvin 1577FF, Tinuvin 320, Tinuvin 326, Tinuvin 327, Tinuvin 328, Tinuvin 384, Tinuvin 400, Tinuvin 400-2, Tinuvin 571, Tinuvin 840, Tinuvin 900, Tinuvin 928, Tinuvin P (Tinuvin is a trademark registered to Ciba-geigy Corporation); Uvinul 3035, Uvinul 3039, Uvinul 3048, Uvinul 400, Uvinul D 49, Uvinul D 50, Uvinul P 25, Uvinul T-150 (Uvinul is trademark owned by BASF Corporation).

Adhesion promoting agents can be added to the polyaryl or polyheteroaryl electroactive polymer film to enhance the degree to which the films adhere to any contacting surfaces, such as the substrate surface. Suitable adhesion promoting agents include, but are not limited to: silane coupling agents, and commercially available adhesion promoting agents like those sold by Sartomer Co., such as Alkoxylated Trifunctional Acrylate (9008), Trifunctional Methacrylate Ester (9010 and 9011), Trifunctional Acrylate Ester (9012), Aliphatic Monofunctional Ester (9013 and 9015) and Aliphatic Difunctional Ester (9014).

The quality of a polyaryl or polyheteroaryl electroactive polymer film that is formed according to the present invention can be assessed by measuring the resistivity (or conductivity) of the film. Using the processes of the present invention, it is possible to form a PEDOT film having a resistivity of between about 100 $\Omega/cm^2$ and about 300 $\Omega/cm^2$.

Polyaryl and polyheteroaryl polymer films can also be characterised or analysed by other suitable techniques, such as UV-vis-NIR spectroscopy, optical microscopy, XPS, AFM, mass spectroscopy, etc. Good quality films are characterised by having low absorption in the UV-vis-NIR region and an extended absorption tail into the NIR region (i.e. >850 nm). Specifically, high resistance PEDOT films are characterised by a flattening of the NIR tail (>850 nm) and significant absorption in the UV-blue region (<430 nm), giving rise to their characteristic greenish tinge. Low resistance PEDOT films are characterised by an extended NIR absorption tail and a pronounced absorption dip in the UV-vis region.

The thickness of the polyaryl or polyheteroaryl polymer films will typically be about 20 nm to about 300 nm. Films having a thickness of between about 50 nm and about 100 nm are particularly suitable.

Electrochromic devices containing the electrochromic substrate may have a low yellowness index, which means that they have a slight blue tinge which is desirable for some applications, such as in automotive rear view mirrors. Electrochromic devices containing the electrochromic substrate typically have a Yellow Index YI(D1925) of less than 1 and most of the time have a negative YID. The negative number means there is a complete lack of yellow and the device has a blue appearance. The yellowness is measured according to the ASTM (D1925) standard.

In reflection mode (i.e. a mirror) we have achieved a delta change of % $\Delta R = 45\%$ photopic. In transmission mode we have achieved a delta change of % $\Delta T = 55\%$ photopic. A photopic response is a weighted average response in the 400-700 nm wavelength range that mimics the response of the human eye.

Using the processes of the present invention we have been able to form electrochromic devices having switching speeds of less than 0.5 sec to switch from dark to bleached state and/or less than 0.7 sec to switch from bleached state to darkened state. The switching speed is the time taken to go from the fully darkened state to 90% of the fully bleached state and the time taken to go from the fully bleached state to 90% of the darkened state.

We have also subjected electrochromic devices to 250,000 cycles and measured the degradation in performance. The data are shown in Table 2.

TABLE 2

Transmission data for new cell vs cell after 250k cycles

|  | New Cell 143 | Old Cell 143 (250k cycles) |
| --- | --- | --- |
| Transmission (min) | 17% | 17% |
| Transmission (max) | 64% | 60% |
| Delta Transmission | 47% | 43% |

Figure 6:
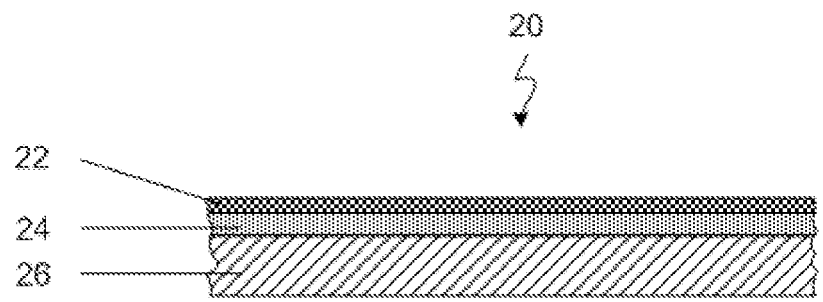
FIG. 6 is a schematic cross sectional side view of an electrochromic substrate according to an embodiment of the present invention.

In an embodiment of the invention the electrochromic substrate is an electrode, as shown in FIG. 6. The electrochromic substrate 20 includes a substrate 26, typically a transparent substrate such as a glass or plastic substrate. The substrate 26 is coated with a layer of inorganic conductive material 24, such as a transparent layer of indium-tin oxide (ITO). The polyaryl or polyheteroaryl electroactive polymer film 22 is coated over the layer of inorganic conductive material 24.

The laminate structure of the electrochromic substrate 20 consists of layer(s) or film(s) of different materials. The layer(s) or film(s) can be continuous or patterned, and be applied to each other (self-supporting device) or to a support (supported device). Furthermore, the terms layer and film are intended to encompass all of the same material in the same plane, regardless whether this material is patterned or interrupted in such a way as to form discontinuous islands in the plane.

Typically, the electrochromic substrate 20 will be rectangular or square in profile. However, it will be appreciated that it may have any shape, such as disc shaped, cuboid, flakelike with a square or rectangular profile or spherical. The profile and shape of the electrochromic substrate 20 may ultimately be dictated by the end use of the substrate, such as the case when it is used in a vehicle rear view mirror.

The electrochromic substrate 20 can be used in an electrochromic device. In a simplest form, the electrochromic substrate 20 can be electrically coupled to another electrode and the two electrodes contacted with an electrolyte to complete a circuit. The colour change of the electroactive polymer film 22 (and hence the electrochromic substrate 20) can be driven by applying an external voltage to the circuit.

An electrochromic device of the present invention includes a pair of electrodes, at least one of which is transparent and at least one of which is an electrochromic substrate produced by any of the aforementioned processes. The electrochromic device also includes an electrolyte in contact with the electrodes.

In one embodiment both electrodes are transparent. In another embodiment one of the electrodes is transparent and the other reflective.

The electrochromic device can be designed in a variety of ways. Any number of electrodes for connection to an external voltage can be applied, though only the minimum two are required.

Figure 7:
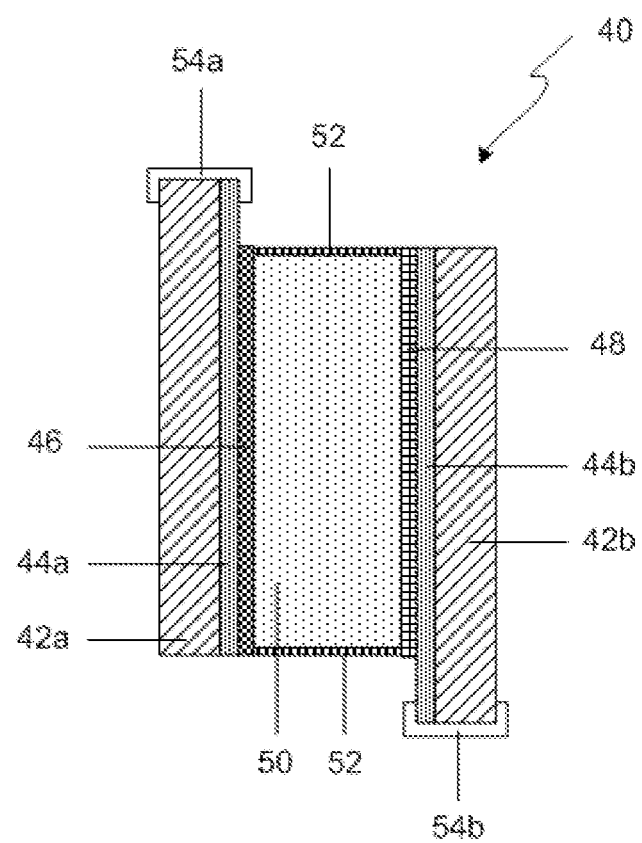
FIG. 7 is a schematic cross sectional side view of an electrochromic window device according to an embodiment of the present invention.

FIG. 7 shows a schematic cross sectional side view of a first embodiment of an electrochromic device 40 suitable for use as an electrochromic window. The device 40 includes a first electrochromic substrate that is formed according to the processes of the present invention. The first electrochromic substrate includes a transparent substrate 42a, typically a glass or plastic substrate. The substrate 42a is coated with a transparent layer 44a of inorganic conductive material, such as a layer of indium-tin oxide (ITO) to form a conductive substrate. A polyaryl or polyheteroaryl electroactive polymer film 46 formed in accordance with the present invention is coated over the layer of inorganic conductive material 44a. The electroactive polymer film 46 may be formed from PEDOT according to any one of the processes of the present invention and is cathodically coloring and forms the cathode of the device 40.

A second electrochromic substrate (which may or may not be formed in accordance with a process of the present invention) includes a transparent substrate 42b, typically a glass or plastic substrate, and a transparent layer 44b of inorganic conductive material, such as a layer of indium-tin oxide (ITO) to form a conductive substrate. An electroactive polymer film 48 is coated over the layer of inorganic conductive material 44b. The electroactive polymer film 48 is prepared using any suitable method, including solution coating, vapour phase polymerisation, or electrochemical coating. The electroactive polymer film 48 is anodically coloring and formed from polypyrrole, polyaniline or a derivative thereof, such as poly-methoxyaniline-5-sulfonic Acid (PMAS). It is also contemplated that other electrochromic polymers or metal oxides be used to form the electroactive polymer film 48. The electroactive polymer film 48 forms the anode of the device 40.

The polyaryl or polyheteroaryl electroactive polymer film 46 and the electroactive polymer film 48 are selected to have a combined absorption spectrum which is maximum across the photopic spectrum when an electric potential is applied between the films. When a reverse electric potential is applied between the films they have a combined absorption spectrum which is minimum across the photopic spectrum. As each of the electrochromic polymer films is substantially transparent, the colour change is visible to the user.

An ion conducting layer 50 of an electrolyte is interposed between the polyaryl or polyheteroaryl electroactive polymer film 46 and the electroactive polymer film 48. The ion conducting layer 50 may be a solid polymeric electrolyte, such as a copolymer of ethylene oxide and methyl glycidyl ether or butylene oxide, or a polyurethane, each of which contains at least one ionisable salt. The ion conducting layer 50 could also be a liquid electrolyte. Ionic liquids such as 1-ethyl-3-methyl imadozolium bistrifluoromethane sulfonamide are suitable.

The ion conducting layer 50 is held between the polyaryl or polyheteroaryl electroactive polymer film 46 and the electroactive polymer film 48 by forming seals 52 therebetween. The electrochromic substrates and ion conducting layer 50 do not have to completely overlap, even though some overlap is needed for electric and/or ionic current to pass between them. Thus, the electrochromic substrates can be displaced with respect to one another. This allows for electrical contacts 54a and 54b to be connected to each substrate.

In use, the application of a voltage differential between the electrochromic substrates causes the migration of ions from one electrochromic polymer film, through the ion conducting layer, and into the other electrochromic polymer film, thereby causing each of the electrochromic polymer films to become either bleached or coloured. Thus, when a voltage is applied, the electrochromic substrate containing electroactive polymer film 48 is polarised positive (anode) and the electrochromic substrate containing polyaryl or polyheteroaryl electroactive polymer film 46 is polarised negative (cathode), whereupon an electric field is induced in the ion conducting layer 50. This causes reduction of the polyaryl or polyheteroaryl electroactive polymer film 46 and oxidation of the electroactive polymer film 48. The extent of the colour change is dependent on the voltage applied and the specific materials used.

Figure 8:
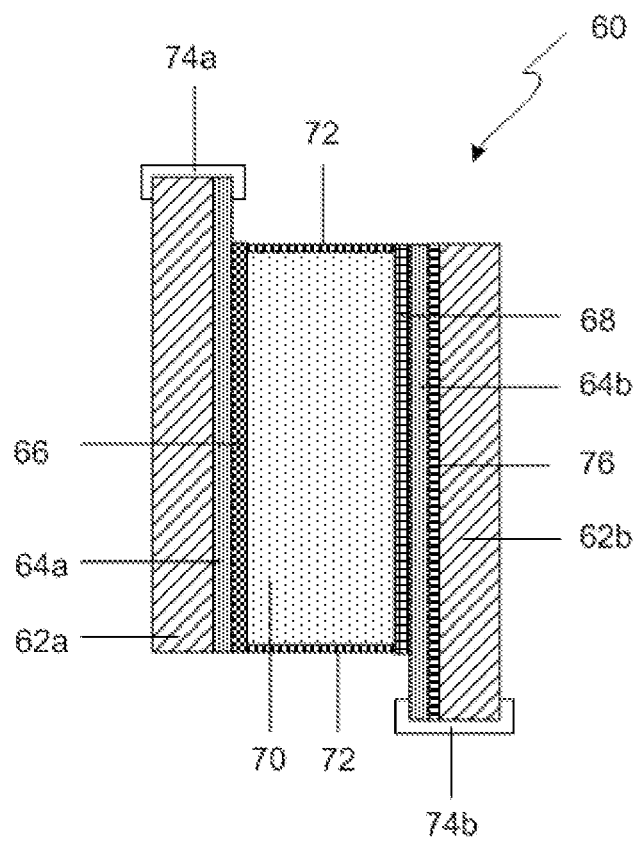
FIG. 8 is a schematic cross sectional side view of an electrochromic mirror device according to an embodiment of the present invention.

In FIG. 8, a similar set up to that in FIG. 7 is shown, except that a reflective layer 76 is located between substrate 62b and the transparent layer 64b of inorganic conductive material. The device 60 is suitable for use as a dimming mirror.

Briefly, the device 60 includes a first electrochromic substrate including a transparent substrate 62a which is coated with a transparent layer 64a of inorganic conductive material. A polyaryl or polyheteroaryl electroactive polymer film 66 formed in accordance with the present invention is coated over the layer of inorganic conductive material 64a. As before, the electroactive polymer film 66 is cathodically coloring and forms the cathode of the device 60. A second electrochromic substrate includes a transparent substrate 62b, a transparent layer 64b of inorganic conductive material, and an electroactive polymer film 68 coated over the layer of inorganic conductive material 64b. The reflective layer 76 is located between the substrate 62b and the layer of inorganic conductive material 64b. The reflective layer 76 may be made from any of those materials known in the art to be useful as reflective films, such as Al, Au or Ag. Upon application of a potential difference between the electrochromic substrates, a colour change in the electrochromic material takes place, in analogy to what has been described above.

Ideally the anodically colouring electrochromic polymer film is transmissive to a major portion of the visible spectrum in its reduced form. Upon oxidation, absorption is induced in the visible region resulting in at least a partially colored state. The complementary cathodically coloring electrochromic polymer film is transmissive and only lightly colored when oxidised. Reduction of the oxidised form returns the cathodically coloring electrochromic polymer film to a colored state.

The application of a potential to the electrochromic device thereby provides a dimming condition for the electrochromic device. Mirrors which are capable of reversibly dimming may be used in the automotive industry. In addition, the arrangement can be used in electrochromic glazing where a change in color or transmissivity of an element can provide a dimming condition to a window or other type of screen. This dimming can increase the level of privacy to an area as well as control the level of radiant heat that permeates an area. Electrochromic glazing may be used in many industries including the automotive industry, architectural, industrial and aeronautical industries, etc.

Means can be provided for controlling the potential applied to electrochromic element so as to provide various dimming and non-dimming conditions. This is particularly advantageous in a vehicle rear view mirror where activation is required when headlights cause glare in the mirror. For instance, a photoelectrical switching device in the form of a photodiode, phototransistor or photocell such as an LDR can be used as a control means input. When the photoelectric switch senses the headlights of a following vehicle, the control means can be activated to provide a potential across the electrodes. Photovoltaic cells and power storage devices such as batteries may also be employed, for instance to provide self-powered dimmable mirrors.

Using the processes of the present invention, it is possible to produce electrochromic substrates that include an electroactive polymer film on a surface of the substrate, wherein the electroactive polymer film has a colouration efficiency of greater than about 2000 $cm^2/C$. as determined using the method set out in: (i) Fabretto, M., et al., *Electrochimica Acta* 2008, 53, 2250-2257; and (ii) Fabretto, M., et al., *Electrochemistry Communications* 2007, 9, 2032-2036. The electrochromic device may contain such a substrate.

Using the processes of the present invention, it is possible to produce electrochromic substrates that include an electroactive polymer film on a surface of the substrate, wherein the electrochromic substrate has a switching speed of less than about 0.5 sec to switch from darkened state to bleached state, and less than about 0.7 sec to switch from bleached state to darkened state. The electrochromic device may contain such a substrate.

Using the processes of the present invention, it is possible to produce electrochromic substrates that include an electroactive polymer film on a surface of the substrate, wherein the electrochromic substrate has a delta change of % $\Delta R=45\%$ photopic in reflection mode or a delta change of % $\Delta T=55\%$ photopic in transmission mode. The electrochromic device may contain such a substrate. Specifically, an electrochromic device including a first substantially transparent electrochromic substrate may have a delta change of % $\Delta T=55\%$ photopic in transmission mode, whilst an electrochromic device including a first substantially transparent electrochromic substrate and a second electrochromic substrate having a reflective layer on a surface thereof may have a delta change of % $\Delta R=45\%$ photopic in reflection mode.

The electrochromic substrate and/or element of the present invention can be used for any suitable application and the applications described above are merely illustrative of some suitable applications.

EXAMPLES OF EMBODIMENTS OF THE INVENTION

EDOT monomer was supplied from Aldrich, Fe(III) tosylate (40 wt % solution in butanol, Baytron CB40) was supplied from H.C Stark and poly(propylene glycol)-poly(ethylene glycol)-poly(propylene glycol) (PPG-PEG-PPG) tri-block polymer was supplied from Aldrich. All chemicals were used without further purification.

Example 1

Production of Electrochromic Glass Substrates

Vapour phase polymerization was carried out in an in-house designed vacuum chamber as shown in FIG. 1. The chamber was fitted with four peltier devices (40×40 mm, 51.4 W single stage, RS Components) for individual temperature control of monomer, water and substrate(s). Temperature was monitored via K-Type thermocouples (RS Components) mounted onto the peltier device surfaces. Individual control of temperature allows the partial pressure of the monomer and water vapour to be varied as well as providing control of the temperature of the substrate. Substrate temperature was set prior to chamber evacuation, the VPP chamber was pumped down to 1 mBar (monitored by a baratron pressure gauge), and the monomer and water temperatures were then raised to their designated values.

Samples to be covered with PEDOT were either glass or indium tin oxide (ITO) glass (Yih Dah Co, Taiwan) cut into 40×40 mm squares. The substrates were cleaned with a mild commercial detergent, ethanol and rinsed with milliQ water (resistivity >18MΩ·cm) followed by 2 minutes in an air plasma chamber (Harrick, PDC-32G, USA). The oxidant, Fe(III) tosylate, was further diluted with butanol (99%, Aldrich) down to a 16 wt % solution. A 5 wt % (Mw=2700) tri-block polymer was added to the oxidant solution to help prevent crystallization during solvent evaporation. The oxidant solution was subsequently kept dry by adding molecular sieves (4 A, 1.6 mm pellets, Aldrich) to the container.

The oxidant solution was spin-coated onto the substrate at 3000 rpm for 10 seconds (Laurell, WS-400B, USA) followed by drying at 60° C. on a hotplate for 1 minute. The substrate was then mounted into the chamber without delay.

Post polymerization any un-reacted monomer and oxidant was washed out by initially immersing the substrate in an ethanol bath for 5 minutes, blow drying with instrument quality $N_2$, rinsing with an ethanol spray, and finally drying with $N_2$. The substrate was then placed into an oven at 60° C. for 30 minutes to expel any bound volatiles.

PEDOT films were characterised by UV-vis-NIR spectroscopy and XPS (Axis Ultra DLD spectrometer, Kratos, UK). The conductivity of the samples was measured using a four-point probe from Jandel Engineering (RM3 Drive Unit, 500 μm tip radius tungsten-carbide needles, with a factory preset load of 60 g). To eliminate contact-point errors and thermovoltage offsets the measurements were recorded with positive and then negative current applied. Reported conductivity is the average of at least nine measurements across the substrate unless otherwise stated.

Table 3 shows the surface resistivity for PEDOT films at various water vapour pressures, whilst keeping substrate and monomer temperatures constant (≈27° C.). At the two lowest water vapour pressures (5.1 and 5.3 mBar) film formation did not occur or was very patchy and of poor quality (no film formation and 3.6 k$\Omega$/cm$^2$). This result is consistent with the notion that insufficient water vapour leads to a situation where continuous polymerization is not possible. Either the arrival or departure rate is such that water vapour is unable to effectively act as a volatile Lewis base and thus little or no polymerization of the EDOT monomer occurs. At a pressure of 6.7 mBar the film resistance rapidly fell to a value of 564 $\Omega$/cm$^2$ with a further improvement to 347 $\Omega$/cm$^2$ recorded at a pressure of 11.0 mBar. At an approximate pressure of 22 mBar film formation was not possible due to macroscopic water vapour condensation on the substrate, leading to the formation of a wet film.

TABLE 3

Surface resistance ($\Omega$/cm$^2$) for VPP PEDOT films for various water vapour pressures.

| Water Vapour Pressure (mBar) | Substrate Temperature (° C.) | Film Resistance ($\Omega$/□) | Comments |
|---|---|---|---|
| 5.1 | 27 | N/A | No film formation |
| 5.3 | 27 | 3600 | Poor patchy film formation |
| 6.7 | 27 | 560 | Good film formation, slight greenish tinge |
| 11 | 27 | 350 | Good film formation |
| 22 | 27 | N/A | Water condensation, patchy film formation |

Substrate temperature and EDOT monomer pressure kept constant.

The substrate temperature was also increased (over the ambient VPP chamber temperature) to see if this would alter the arrival and/or departure rate of H$_2$O and H$_3$O$^+$. The lowest resistivity was recorded at a substrate temperature of 30° C., namely 270 $\Omega$/cm$^2$, followed by 310 $\Omega$/cm$^2$ at 35° C. with no film formation occurring at 40° C.

TABLE 4

Surface resistance ($\Omega$/□) for VPP PEDOT films for various substrate temperatures.

| Water Vapour Pressure (mBar) | Substrate Temperature (° C.) | Film Resistance ($\Omega$/cm$^2$) | Comments |
|---|---|---|---|
| 10 | 30 | 270 | Good film formation |
| 10 | 35 | 310 | Good film formation |
| 10 | 40 | N/A | No film formation |

Water vapour pressure and EDOT monomer pressure kept constant.

Example 2

Production of Electrochromic Glass Substrates

Samples were prepared on glass substrates for surface resistance measurements and Indium Tin Oxide (ITO) coated glass with a surface resistance of 15 $\Omega$/cm$^2$ (Yih Dah Co., Korea) for Tof-SIMS measurements. Substrates were cut to 5 cm×5 cm plates and washed with mild detergent, acetone and ethanol. Then substrates were subjected to plasma treatment (PDC-32G, Harrick, USA) for about 2 minutes.

The substrates were then spin coated with solution of Fe(III) tosylate in n-butanol (40% Baytron C-B 40 and 60% n-butanol) with varied concentration of PEG-ran-PPG in different experiments using spincoater Laurell Technologies Corporation, Model WSW-400B-6NPP/LITE/AS with 1000 RPM for 15 s. Then samples were left for 60 seconds on a hot plate at 70° C. to evaporate the butanol. Directly from the hot plate samples were moved for 30 minutes to the polymerization chamber which was a standard 16 L glass dessicator. The polymerization process was carried under atmospheric pressure and the chamber was kept on a hot plate at 70° C. in a fume cabinet which gave a temperature of 33±1° C. in the sample position. EDOT concentration was kept in saturation state—as condensation of monomer at the walls of chamber was observed. Humidity and temperature inside the chamber was measured with a Sensirion Evaluation Kit EK-H2 with SHT15 sensor and filter cap SF1 and was recorded during polymerization process. Relative Humidity (RH) was controlled through the addition of water drops (approximately 0.03 g of water) directly after putting samples in to the chamber. Lower humidity values were achieved by adding desiccant crystals to the chamber and flushing with nitrogen at 600 mL/min. During the polymerization process a standard magnetic stirrer was running for better gas circulation. After 30 min in the polymerization chamber samples were washed with ethanol for 10 min to remove residual Fe(III) tosylate and then dried with an air gun, spray rinsed with ethanol once again and dried. Then samples were heated in an oven at 60° C. for 30 minutes.

Resistivity was measured with four-point probe (model RM3, Jandel Engineering, Ltd.) with 100 µm tips. The resistivity of a given sample at given humidity was calculated by taking the average value. Microstructure pictures of samples were taken on an Olympus BH2-UMA optical microscope with 5×, 10× and 50× Olympus lenses with Moticam 2300 3.0 Mpixel camera attached. AFM measurements were made on a Digital Instruments, Nanoscope III operating in tapping mode. ToF-SIMS analyses were performed with a PHI TRIFT II (model 2100) spectrometer (PHI Electronics Ltd, USA) equipped with $^{69}$Ga liquid metal ion gun (LMIG). The total area of crystallized tosylate was measured by analyzing pictures using the program, Gimp. Unchanged monochromatic areas were removed using wizard tool. The contrast setting was maximized which split the histogram into two peaks and removed any unmarked pixels. The pixels with maximum brightness were related to non-crystallized areas and pixels with minimum brightness were related to crystallite regions. The total crystallic area was defined as a ratio of dark pixels to the total number of pixels. 9 to 13 pictures taken from different points of the sample were processed with this method to get better statistics. Temperature and humidity in the laboratory was 23° C. and 35% RH.

Samples without PEG-ran-PPG were kept for 30 min in chamber without EDOT monomer at several humidity values. No crystals were observed in samples kept below 46% RH. For samples kept at 36% RH and 46% RH macroscopic fringes were observed with period approx 500 µm which is the precursor to crystal formation (observed in other similar samples). A sample kept at 28% RH was completely free of any crystal formation. Another sample prepared at 46% RH contained single crystal nuclei occupying less than 0.5% of the total surface area. A sample prepared at 48% RH had 1.0±0.5% area crystallized, a sample kept at 52% RH had 11.0±3.0% and a sample kept at 59% RH had 44±5.0% crystallic area. This indicates that there is a threshold value for humidity, above which Fe(III) tosylate crystallizes. Further tests were made with PEG-ran-PPG addition—one sample was prepared without PEG-ran-PPG added and three with 5%, 10% and 15% of total mass of Fe(III) tosylate solution. The first batch was kept at 50% RH and only the sample without PEG-ran-PPG contained crystals embedded in the surface. A second batch was kept at 62% RH and only the sample with 15% PEG-ran-PPG was crystal free. Different crystal shapes were observed with different PEG-ran-PPG loadings. This indicates that PEG-ran-PPG inhibits crystal nucleation in Fe(III) tosylate.

Four samples were prepared with: 0%, 5%, 10% and 15% PEG-ran-PPG of the total mass of Fe(III) tosylate solution. Samples were polymerized at 47% RH. The resistivity of the samples were 715±30 $\Omega/cm^2$ for 0% PEG-ran-PPG added to oxidant solution, 130±10 $\Omega/cm^2$ for the 5% sample, 450±40 $\Omega/cm^2$ for the 10% sample and 2030±160 $\Omega/cm^2$ for the sample with 15% of PEG-ran-PPG added. It was also observed that the addition of PEG-ran-PPG may also inhibit polymerization of PEDOT. The optimal concentration of PEG-ran-PPG is 5%.

Figure 2:
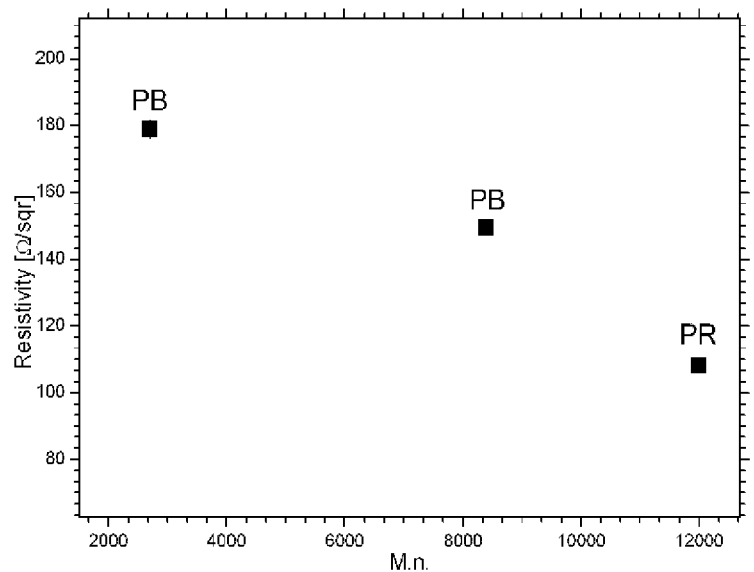
FIG. 2 is a plot of molecular weight (Daltons) vs resistivity ($\Omega/cm^2$) for electrochromic substrates produced with different molecular weight amphiphilic polymers.

Samples were also prepared with different amphiphilic polymers of different molecular weights, namely PPG-PEG-PPG (2700 Daltons), PEG-PPG-PEG (8400 Daltons), and random PEG-PPG (12000 Daltons). 5% by weight of the amphiphilic polymer was added and the tests were done at RH=32%. The results are shown in FIG. 2.

Figure 3:
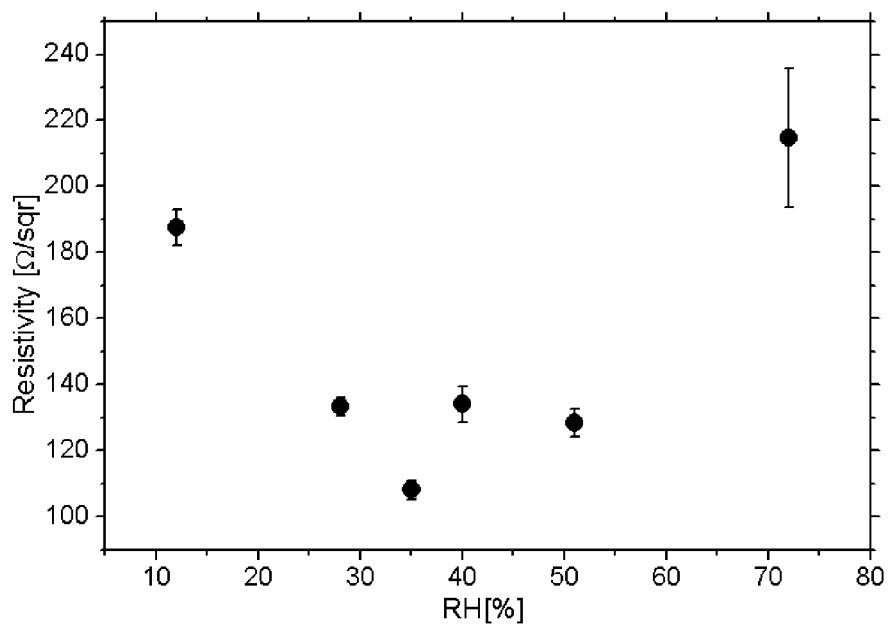
FIG. 3 is a plot of relative humidity (%) vs resistivity ($\Omega/cm^2$) for electrochromic substrates produced at atmospheric pressure are different relative humidities.

Samples prepared using Fe(III) tosylate with 5% of PEG-ran-PPG were polymerized at approximately 12%, 28%, 35%, 40%, 50% and greater than 70% relative humidity. For the low humidity run, the initial humidity was 6% RH. Opening the chamber to place the samples in increased the initial humidity to 12% RH after which it decreased exponentially back to 6% RH. Samples which were polymerized at 50% RH and below had no surface defects. Surface resistivity for the samples remained essentially the same for values of humidity between 28% and 50% RH. Samples prepared above 70% RH had the highest resistivity due to holes in the film. Samples prepared below 12% RH also had higher resistivity. This is probably due to the influence of water on the polymerization process (i.e. water is required for the polymerization to occur). It was noted that samples polymerized at a humidity of approximately 12% RH shrunk during washing. The best results were achieved for samples prepared at 35% RH which had a resistivity of 108±3.0 $\Omega/cm^2$ at plateau. The data is shown in FIG. 3.

Example 3

Production of an Electrochromic Automotive Mirror

One half of the electrochromic mirror device comprises of an Indium Tin Oxide (ITO) coated glass with a surface resistance of 15 $\Omega/cm^2$ (Yih Dah Co., Korea) and a vapour phase polymerized PEDOT. This conducting polymer is cathodically coloring and forms the cathode of the device.

The other half consists of an ITO/aluminum coated glass with surface resistance of 15 $\Omega/cm^2$ (Yih Dah Co., Korea) coated with an anodically coloring polymer, such as Poly-MethoxyAniline-5-Sulfonic Acid (PMAS) and forms the anode. The PMAS was prepared according to the method of Zhuo et al (Zhou et al., *Synthetic Metals* 2000, 14, 87-293).

Substrates were prepared by washing with a mild detergent, acetone and ethanol. Then the substrates were subjected to plasma treatment (PDC-32G, Harrick, USA) for about 2 minutes.

Cathode Preparation

The substrate was dip coated with a solution of iron(III) tosylate in n-butanol (12% Baytron C-B 40 and 78%% n-butanol) with 5% by weight PEG-ran-PPG (MW=12000) at a pull out speed of 0.8 mm/s. The sample was left for 60 seconds on a hot plate at 70° C. to evaporate the butanol. Directly from the hot plate the sample was moved to the polymerization chamber, a standard 16 L glass desiccator, for 30 minutes. The polymerization process was carried under atmospheric pressure and the chamber was kept on a hot plate at 70° C. which gave a temperature of 33±1° C. at the sample position. EDOT concentration was kept in a saturated state—as condensation of monomer at the walls of chamber was observed. Humidity and temperature inside the chamber were measured with a Sensirion Evaluation Kit EK-H2 with SHT15 sensor and filter cap SF1 and was recorded during polymerization process. Relative Humidity (RH) was maintained at 35% RH via the addition of water drops. During the polymerization process a standard magnetic stirrer was running to aid vapour circulation. The sample was then rinsed in ethanol for 10 min to remove residual iron(III) tosylate. The sample was dried with an air gun, and spray rinsed with ethanol once again and dried. The sample was then placed in an oven at 60° C. until ready for assembly.

Anode Preparation

The substrate was spray coated with a dispersion of PMAS (3% by weight) in water with a wetting agent (BYK-192, BYK, Germany) added (2% by weight). This surfactant helps the wet the substrate during spray deposition. Multiple light coats were applied to the substrate with an airbrush until the reflectivity dropped from 87% to 81%. The samples were then placed in an oven at 60° C. until ready for assembly.

Assembly

The two halves of the electrochromic device were assembled with the polymer coated sides facing each other and offset relative to one another. A spacer of 150 microns was used to hold the two halves apart and glue applied to the edges. A gap was left at one end of the device, which acted as a fill port. Once the glue had cured the device was placed in a vacuum chamber with the fill port immersed in an electrolyte, namely an ionic liquid (1-ethyl-3-methyl imadozolium bis-trifluoromethane sulfonamide). The chamber was evacuated and held at vacuum for 30 minutes. On venting to air, the ionic liquid electrolyte is forced up into the gap, thus filling the device. After cleaning the fill port is sealed with glue.

Testing

Figure 9:
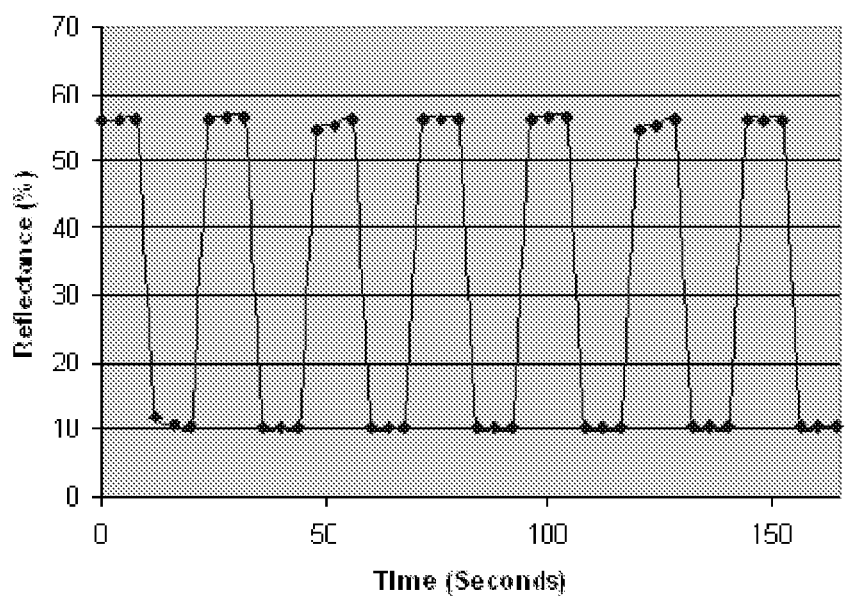
FIG. 9 is a plot of time (s) vs reflectance (%) for an automotive mirror according to an embodiment of the present invention.
Figure 10:
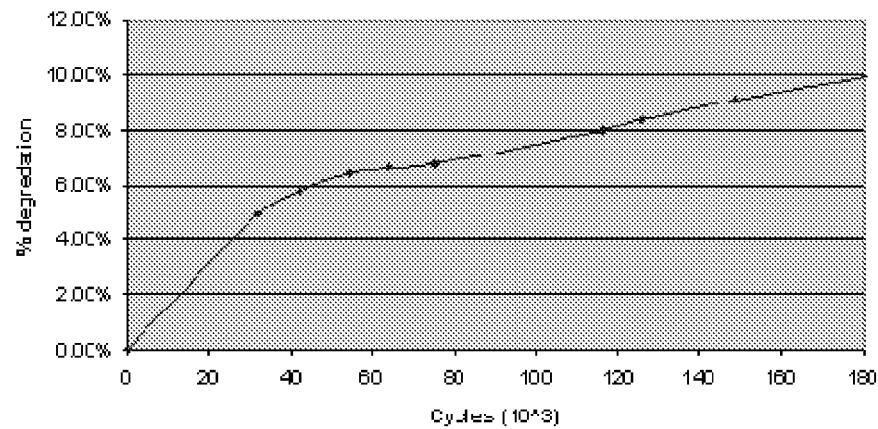
FIG. 10 is a plot of number of cycles vs amount of degradation (%) for an automotive mirror according to an embodiment of the present invention.

The device was tested by placing a switching potential between +1.7V and −1.2V across the anode and cathode. The change in photopic reflectance was measured on a Hunterlab Ultrascan Pro using A illuminant at a 2° observer. As best seen in FIG. 9, the reflectance switched between 10% and 55% and back again in under 2 seconds. After 250,000 cycles the switching range had decreased by less than 10% (See FIG. 10).

Figure 11:
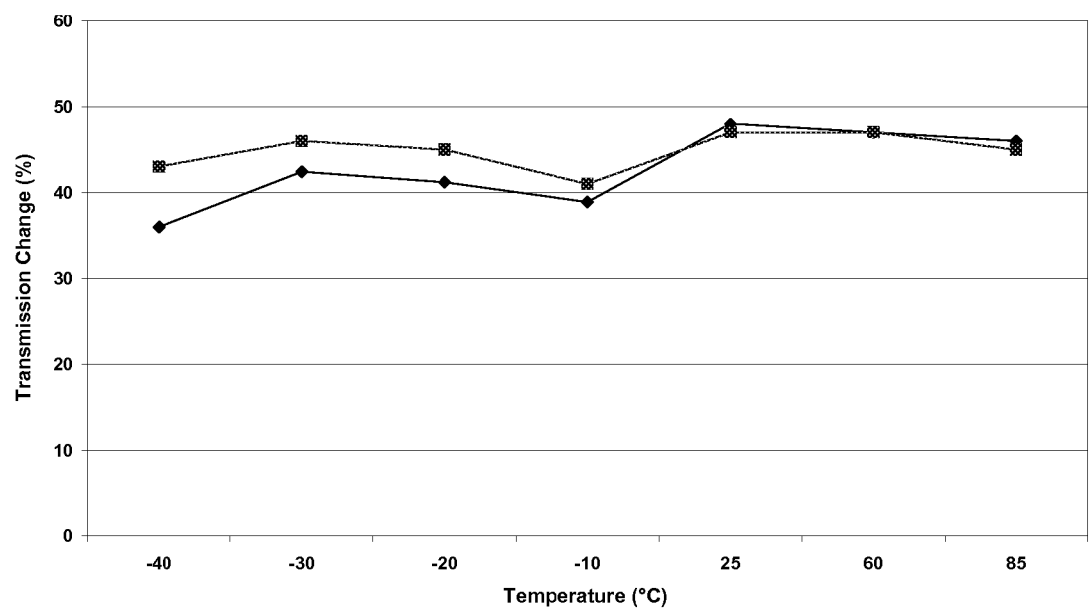
FIG. 11 is a plot of temperature (° C.) vs transmission change (%) for an electrochromic device according to an embodiment of the present invention.
Figure 12:
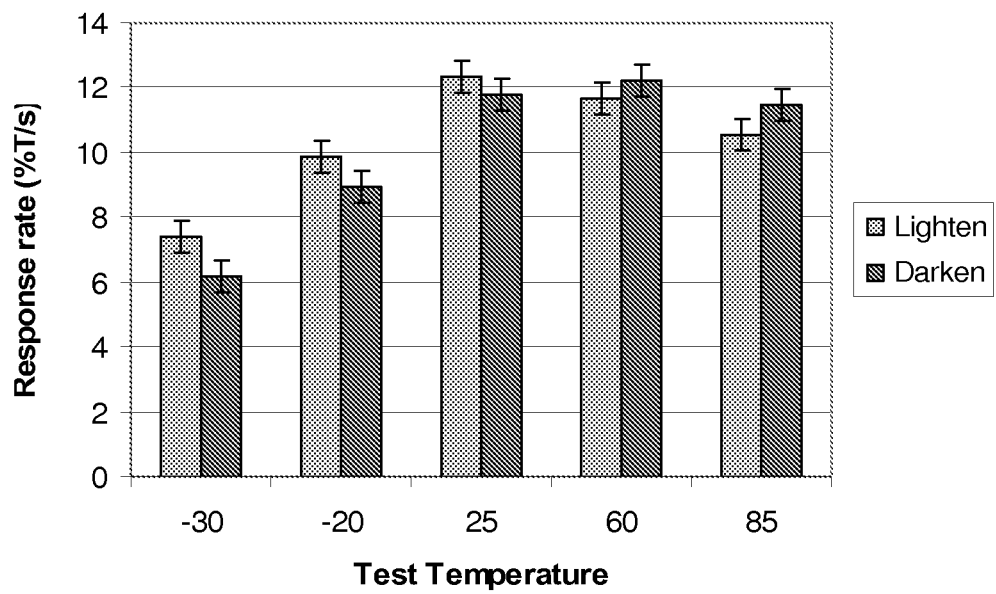
FIG. 12 is a plot of temperature (° C.) vs response rate (% T/s) for an electrochromic device according to an embodiment of the present invention.

The change in transmission with temperature from −40° C. to 85° C. is shown in FIGS. 11 and 12. FIG. 12 shows the rate at which the cell changes transmission in % T/s. It is not until the cells are at −30° C. that they slow down appreciably. That is at −30° C. the cells change transmission at about half the rate they change at when they are at ambient temperature.

Example 4

Production of an Electrochromic Window

One half of the electrochromic device comprises of an Indium Tin Oxide (ITO) coated glass (40 cm×40 cm) with a surface resistance of 15 $\Omega/cm^2$ (Yih Dah Co., Korea) and a vapour phase polymerized Poly(Methyl-Propylene-Dioxythiophene) (MeProPRODOT). This conducting polymer is cathodically coloring and forms the cathode of the device.

The other half consists of an ITO coated glass (40 cm×40 cm) coated with an anodically coloring polymer, such as Polyaniline (PANI) and forms the anode. The PANI was prepared according to the method of Kaner (Li Dan; Kaner Richard B, Journal of the American Chemical Society (2006), 128(3), 968-75).

Substrates were prepared by washing with a mild detergent, acetone and ethanol.

Cathode Preparation

The substrate was dip coated with a solution of iron(III) tosylate in n-butanol (12% Baytron C-B 40 and 78%% n-butanol) with 5% by weight PEG-ran-PPG (water loaded), at a pull out speed of 0.8 mm/s. The sample was left for 60 seconds on a hot plate at 70° C. to evaporate the butanol. Directly from the hot plate the sample was moved to the polymerization chamber, a large 116 L oven, for 30 minutes. The polymerization process was carried under atmospheric pressure and the oven was kept at 150° C. MeProProDOT concentration was kept in a saturated state. Humidity and temperature inside the chamber was measured with a Sensirion Evaluation Kit EK-H2 with SHT15 sensor and filter cap SF1 and was recorded during polymerization process. Relative Humidity (RH) was 10% RH. During the polymerization process an internal fan was running to aid vapour circulation. The sample was then rinsed in ethanol for 10 min to remove residual iron(III) tosylate. The sample was dried with an air gun, rinsed with ethanol once again and dried. The sample was then placed in an oven at 60° C. until ready for assembly.

Anode Preparation

The substrate was spray coated with a dispersion of PANI in water with a wetting agent (BYK-192, BYK, Germany) added (2% by weight). This surfactant helped the wetting of the substrate during spray deposition. Multiple light coats were applied to the substrate with a Sonotech Ultrasonic spray deposition system until the transmission dropped from 87% to 72%. The samples were then placed in an oven at 60° C. until ready for assembly.

Assembly

The two halves of the electrochromic device were assembled with the polymer coated sides facing each other and offset relative to one another. A spacer of 150 microns was used to hold the two halves apart and glue applied to the edges. A gap was left at one end of the device, which acted as a fill port. Once the glue was cured the device was placed in a vacuum chamber with the fill port immersed in an electrolyte, namely an ionic liquid (1-ethyl-3-methyl imadozolium bis-trifluoromethane sulfonamide). The chamber was evacuated and held at vacuum for 30 minutes. On venting to air the ionic liquid electrolyte was forced up into the gap, thus filling the device. After cleaning, the fill port is sealed with glue.

Testing

Figure 13:
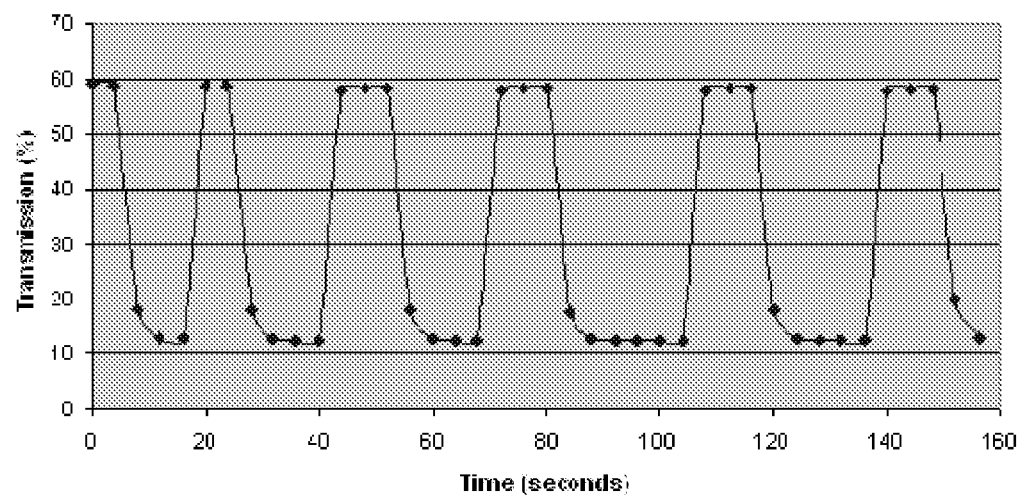
FIG. 13 is a plot of time (s) vs reflectance (%) for an electrochromic window according to an embodiment of the present invention.

The device was tested by placing a switching potential between +1.5V and −1.5V across the anode and cathode. The change in photopic transmission was measured on a Hunterlab Ultrascan Pro using A illuminant at a 2° observer. As seen in FIG. 13, the transmission switched between 13% and 58% in under 10 seconds.

In conclusion, it must be appreciated that there may be other variations and modifications to the configurations described herein which are also within the scope of the present invention.

The claims defining the invention are as follows:

1. A process for producing an electrochromic substrate, the process including:
   providing a substrate having an oxidant layer on a surface thereof, the oxidant layer containing an oxidant and an amphiphilic polymer;
   exposing the surface containing the oxidant layer to a vapour containing an aryl or heteroaryl monomer that is polymerizable to form an electroactive polymer; and
   polymerizing the aryl or heteroaryl monomer to form a polyaryl or polyheteroaryl electroactive polymer film on the surface of the substrate.

2. A process according to claim 1, wherein providing a substrate having an oxidant layer on a surface thereof includes:
   coating the surface with an oxidant solution, the solution containing the oxidant, the amphiphilic polymer, and a solvent;
   removing the solvent to form the oxidant layer containing the oxidant and the amphiphilic polymer.

3. A process according to claim 1, wherein polymerization of the aryl or heteroaryl monomer is carried out in the presence of a volatile Lewis base.

4. A process according to claim 1, wherein the amphiphilic polymer is a poly(alkylene glycol) copolymer.

5. A process according to claim 4, wherein the poly(alkylene glycol) copolymer is selected from the group consisting of: a random copolymer containing poly(ethylene glycol) and poly(propylene glycol) segments; and a block copolymer containing poly(ethylene glycol) and poly(propylene glycol) segments.

6. A process according to claim 5, wherein the poly(alkylene glycol) copolymer is a poly(propylene glycol)-poly(ethylene glycol)-poly(propylene glycol) or a poly(ethylene glycol)-poly(propylene glycol)-poly(ethylene glycol) triblock polymer.

7. A process according to claim 5, wherein the poly(alkylene glycol) copolymer is a poly(ethylene glycol-ran-propylene glycol) random copolymer.

8. A process according to claim 3, wherein the volatile Lewis base is selected from the group consisting of: amine containing compounds, carbonyl containing compounds, aromatic heterocyclic compounds, hydroxyl containing compounds, ether containing compounds, ammonia and water.

9. A process according to claim 8, wherein the volatile Lewis base is an amine containing compound.

10. A process according to claim 9, wherein the amine containing compound is selected from the group consisting of: methyl amine, cyclohexylamine, diethylamine, diisopropylamine, dipropylamine, dibutylamine, piperidine, triethylamine, diisopropylethylamine, allylmethylamine, 2,6-di-tert-butylpyridine, 2-pyrrollidone, 2-oxazolidone, pyrrollidine, 2-picoline, 4-picoline, 2,3-cyclohexenopyridine, 2-(methylamino)pyridine, tetrahydroquinoline, morpholine, tetrahydrofurfurylamine, piperazine, 1,2,3,4-tetrahydroisoquinoline, benzylamine, aniline, 1,8-bis(dismethylamino)-naphthalene, 2-(ethylamino)ethanol, N,N-dimethylethylene diamine, N,N'-dimethylethylene diamine, ethylene diamine, and 1,1-dimethyl-hydrazine.

11. A process according to claim 8, wherein the volatile Lewis base is water.

12. A process according to claim 3, wherein the vapor containing the monomer also contains the volatile Lewis base.

13. A process according to claim 3, wherein the volatile Lewis base is contained in the oxidant layer.

14. A process according to claim 11, wherein the step of exposing the surface containing the oxidant layer to a vapour containing an aryl or heteroaryl monomer is carried out in a vacuum chamber and the vapour pressure of the water is about 5 mBar to about 30 mBar (inclusive).

15. A process according to claim 11, wherein the step of exposing the surface containing the oxidant layer to an aryl or heteroaryl monomer is carried out in a sealed chamber having a relative humidity of about 10% to about 70% at 33° C.

16. A process according to claim 1, wherein the temperature of the substrate during formation of the polyaryl or polyheteroaryl electroactive polymer film is about 25 degrees Celsius to about 40 degrees Celsius.

17. A process according to claim 1, wherein the polyaryl or polyheteroaryl electroactive polymer is selected from the group consisting of:
  polyaryl polymers, such as polyphenylene, polyphenylenesulfide, polyaniline, polyquinone, polyfluorene, polyanthraquinone, poly-1,4-phenylene vinylene (PPV), and 2-methoxy-5-ethylhexyloxy poly-1,4-phenylene vinylene (MEH-PPV);
  polyheteroaryl polymers, such as polythiophene (PTh), polypyrrole (PPy), polyfuran (Pfu), polycarbazole (PCz), poly-3,4-ethylenedioxythiophene (PEDOT), poly(3,4-propylene dioxythiophene (PropOT), poly-3,4-(2,2-dimethylpropylene)dioxythiophene (PropOT-Me$_2$), poly-3,4-ethylenedioxypyrrole (PEDOP), poly-3,4-propylenedioxypyrrole (PropOP), poly-N-(3-sulfonatopropoxy)-3,4-propylenedioxpyrrole (PPropOP-NPS), poly-1,2-bis(2-ethylenedioxythienyl) vinylene (PBEDOT-V), poly-1,2-bis(2-propylenedioxythienyl)vinylene (PPropOT-V), poly-2,5-bis(2-ethylenedioxythienyl)pyridine (PBEDOT-Pyr), poly-1,4-bis (2-ethylendioxythienyl)-2,5-didodecyloxybenzene (PBEDOT-B(OC$_{12}$H$_{25}$)$_2$), poly-3-methylthiophene (P3MTh), poly-2,5-(2-ethylenedioxythienyl)furan (PBEDOT-Fu), poly-4,4'-(2-ethylenedioxythienyl)biphenyl (PBETDOT-BP), poly-3,6-(2-ethylenedioxythienyl)carbazole (PBEDOT)-Cz), poly-3-butylthiophene (P3BTh), alkyl poly-3,4-ethylenedioxythiophene (PEDOT-alkyl), aryl poly-3,4-ethylenedioxythiophene (PEDOT-aryl), poly-2,5-(2-thienyl)pyrrole (PSNS), polyviologen (PV), poly-metal phthalocyanines (PM Phth), poly-5,5'-biethylenedioxythiophene (PBiEDOT), poly-1,2-(2-ethylene dioxythienyl)cyanovinylene (PBEDOT-CNV), poly-1,2-(2-thienyl)cyanovinylene (PBTh-CNV), poly[2,5-bis (2ethylenedioxythienyl)-diphenylpyridopyrazine] (PBEDOT-PyrPyr(Ph)$_2$), polythiopehenvinylene, polythiazole, poly(p-pyridine), poly(p-pyridalvinylene), and polyindole;
  and derivatives of any of the aforementioned.

18. A process according to claim 17, wherein the polyaryl or polyheteroaryl electroactive polymer is a poly-3,4-alkylenedioxythiophene.

19. A process according to claim 18, wherein the poly-3,4-alkylenedioxythiophene is poly-3,4-ethylenedioxythiophene (PEDOT).

20. A process according to claim 18, wherein the poly-3,4-alkylenedioxythiophene is poly-3,4-propylenedioxythiophene (PRODOT).

21. A process according to claim 1, wherein the oxidant is a metal salt.

22. A process according to claim 21, wherein the metal salt is the salt of an arylsulphonic acid.

23. A process according to claim 22, wherein the metal salt is iron(III) tosylate.

24. A process according to claim 1, wherein the amphiphilic polymer is a hydrated amphiphilic polymer.

25. A process according to claim 24, wherein the hydrated amphiphilic polymer contains water in an amount of about 0.01 wt % to about 2 wt % (inclusive).

26. An electrochromic substrate produced by any one of the processes of claims 1 to 25.

27. An electrochromic device including an electrochromic substrate according to claim 26.

28. An electrochromic device including:
  a first electrochromic substrate formed according to a process of any one of claims 1 to 25;
  a second electrochromic substrate spaced from the first electrochromic substrate, at least one of the first and second electrochromic substrates being transparent; and
  a substantially transparent ion conducting layer containing an electrolyte in contact with the first and second electrochromic substrates.

29. An electrochromic device, the device including:
  a first substantially transparent electrochromic substrate formed according to a process of any one of claims 1 to 25;
  a second electrochromic substrate spaced from the first electrochromic substrate, the second electrochromic substrate including a substrate, a reflective layer and an electrochromic film over the reflective layer; and
  a substantially transparent ion conducting layer containing an electrolyte in contact with the first and second electrochromic substrates.

30. An electrochromic mirror for a motor vehicle, the mirror including an electrochromic device in a housing, the electrochromic device including:
  a substantially transparent first electrochromic substrate having a substantially transparent electrochromic polymer film on its inward surface;
  a second electrochromic substrate positioned in spaced-apart relationship with the first electrochromic substrate, the second electrochromic substrate having a reflective layer on a surface thereof and an electrochromic film on the reflective layer;
  a seal positioned toward a peripheral edge of each of the first and second electrochromic substrates and forming a sealed cavity therebetween;
  an electrolyte located within said cavity and in contact with the electrochromic polymer film of the first electrochromic substrate and the electrochromic film of the second electrochromic substrate;
  means for applying a potential to the first and second electrochromic substrates to controllably cause a variation in the amount of light reflected from the mirror, wherein the first electrochromic substrate is formed in accordance with a process of any one of claims 1 to 25.

* * * * *